(12) United States Patent
Kim et al.

(10) Patent No.: US 11,178,214 B2
(45) Date of Patent: Nov. 16, 2021

(54) DEVICE AND METHOD FOR TRANSMITTING ELECTRONIC KEY THEREOF

(71) Applicant: Samsung Electronics Co., Ltd., Suwon-si (KR)

(72) Inventors: Hyun-young Kim, Suwon-si (KR); Hee-won Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 16/139,616

(22) Filed: Sep. 24, 2018

(65) Prior Publication Data

US 2019/0028535 A1    Jan. 24, 2019

Related U.S. Application Data

(63) Continuation of application No. 14/059,799, filed on Oct. 22, 2013, now abandoned.

(30) Foreign Application Priority Data

Oct. 22, 2012    (KR) .................. 10-2012-0117548

(51) Int. Cl.
*H04L 29/08* (2006.01)
*G07C 9/00* (2020.01)
(Continued)

(52) U.S. Cl.
CPC ............ *H04L 67/10* (2013.01); *G06F 3/0482* (2013.01); *G07C 9/00571* (2013.01);
(Continued)

(58) Field of Classification Search
CPC ............ G07C 9/00571; G07C 9/00309; G07C 9/00817; G07C 2209/08; H04L 67/10;
(Continued)

(56) References Cited

U.S. PATENT DOCUMENTS 4,914,732 A      4/1990  Henderson et al.
4,988,987 A *    1/1991  Barrett .............. G07C 9/00817
                                                              340/5.28
(Continued)

FOREIGN PATENT DOCUMENTS

CN        1926532 A      3/2007
CN      101763670 A      6/2010
(Continued)

OTHER PUBLICATIONS

"A method of short-range sensored multiple lock management via mobile device." IP.com No. IPCOM000217089D IP.com Electronic Publication Date: May 2, 2012. Available at https://ip.com/IPCOM/000217089 (Year: 2012).*

(Continued)

*Primary Examiner* — James T Tsai
(74) *Attorney, Agent, or Firm* — Jefferson IP Law, LLP

(57)    ABSTRACT

A method for transmitting an electronic key of a device is provided. The method includes transmitting a user command for providing an electronic key to another device, providing a User Interface (UI) for setting a use condition of the electronic key when the user command is received, and transmitting the use condition information set through the UI to the other device together with the electronic key.

14 Claims, 34 Drawing Sheets

(51) Int. Cl.
*G06F 3/0482* (2013.01)
*H04W 4/80* (2018.01)
*H04W 12/08* (2021.01)
*H04L 29/06* (2006.01)
*H04W 12/43* (2021.01)
*H04W 12/61* (2021.01)
*H04W 12/04* (2021.01)

(52) U.S. Cl.
CPC ........... *H04W 12/04* (2013.01); *H04L 63/062* (2013.01); *H04L 63/108* (2013.01); *H04M 2250/04* (2013.01); *H04W 4/80* (2018.02); *H04W 12/08* (2013.01); *H04W 12/43* (2021.01); *H04W 12/61* (2021.01)

(58) Field of Classification Search
CPC .... H04L 63/062; H04L 63/108; H04W 12/04; H04W 4/80; H04W 12/00403; H04W 12/00502; H04W 12/08; H04M 2250/04
See application file for complete search history.

(56) References Cited

U.S. PATENT DOCUMENTS

| | | | |
|---|---|---|---|
| 5,559,945 A * | 9/1996 | Beaudet ............... | G06F 3/0482 715/841 |
| 6,100,889 A | 8/2000 | Sciammarella et al. | |
| 7,042,332 B2 | 5/2006 | Takamura et al. | |
| 7,269,799 B2 | 9/2007 | Lee et al. | |
| 7,394,362 B2 | 7/2008 | Ogino et al. | |
| 7,974,980 B2 | 7/2011 | Matsubara | |
| 8,185,164 B2 | 5/2012 | Kim | |
| 8,232,864 B2 | 7/2012 | Kakiwaki | |
| 8,566,611 B2 | 10/2013 | Kobayashi et al. | |
| 8,756,431 B1 | 6/2014 | Despain et al. | |
| 8,943,187 B1 * | 1/2015 | Saylor ............... | H04L 67/306 709/223 |
| 2002/0024420 A1 | 2/2002 | Ayala et al. | |
| 2002/0180582 A1 | 12/2002 | Nielsen | |
| 2003/0040302 A1 * | 2/2003 | Okada ............... | H04W 48/10 455/414.1 |
| 2004/0201449 A1 | 10/2004 | Denison et al. | |
| 2005/0054384 A1 | 3/2005 | Pasquale et al. | |
| 2005/0225429 A1 * | 10/2005 | Burzio ............... | B60R 25/04 340/5.24 |
| 2006/0028339 A1 | 2/2006 | Ogino et al. | |
| 2007/0197261 A1 | 8/2007 | Humbel | |
| 2007/0222645 A1 | 9/2007 | Rochette et al. | |
| 2007/0226253 A1 | 9/2007 | Matsubara | |
| 2007/0245348 A1 | 10/2007 | Araujo et al. | |
| 2008/0168529 A1 | 7/2008 | Anderson et al. | |
| 2010/0004031 A1 | 1/2010 | Kim | |
| 2010/0013596 A1 | 1/2010 | Kakiwaki | |
| 2010/0141381 A1 | 6/2010 | Sliding et al. | |
| 2010/0283361 A1 * | 11/2010 | Sato ............... | G07C 9/00896 312/222 |
| 2010/0306549 A1 | 12/2010 | Ullmann | |
| 2010/0312605 A1 * | 12/2010 | Mitchell ............... | G06Q 10/06 705/7.13 |
| 2011/0214162 A1 | 9/2011 | Brakensiek et al. | |
| 2011/0289123 A1 * | 11/2011 | Denison ............... | G07F 9/026 707/812 |
| 2012/0075059 A1 | 3/2012 | Fyke et al. | |
| 2012/0159152 A1 | 6/2012 | Ha et al. | |
| 2012/0280783 A1 | 11/2012 | Gerhardt et al. | |
| 2013/0043973 A1 | 2/2013 | Greisen et al. | |
| 2013/0104063 A1 * | 4/2013 | Legris ............... | G06F 3/048 |
| 2013/0305319 A1 | 11/2013 | Matthews, III et al. | |
| 2014/0057561 A1 | 2/2014 | Ko et al. | |
| 2014/0077929 A1 | 3/2014 | Dumas et al. | |
| 2014/0198343 A1 | 7/2014 | Cho | |
| 2014/0232524 A1 | 8/2014 | Nakai et al. | |

FOREIGN PATENT DOCUMENTS

| | | |
|---|---|---|
| CN | 102649419 A | 8/2012 |
| EP | 2 096 240 A1 | 9/2009 |
| EP | 2 434 461 A1 | 3/2012 |
| EP | 2 492 876 A2 | 8/2012 |
| JP | 2005-079765 A | 3/2005 |
| JP | 2007-113306 A | 5/2007 |
| JP | 2007-332546 A | 12/2007 |
| JP | 2011-132804 A | 7/2011 |
| KR | 10-2001-0035783 A | 5/2001 |
| KR | 10-0399194 B1 | 9/2003 |
| KR | 10-2010-0005440 A | 1/2010 |
| KR | 10-1057394 B1 | 8/2011 |
| KR | 10-2012-0014480 A | 2/2012 |

OTHER PUBLICATIONS

Galitz, Wilbur, "The Essential Guide to User Interface Design," Second Edition (2002) ("Galitz"). (Year: 2002).*
Korean Office Action dated Dec. 18, 2019, issued in Korean Patent Application No. 10-2019-0117721.
Chinese Office Action dated Dec. 14, 2018, issued in Chinese Patent Application No. 20130055189.8.
Korean Office Action dated Dec. 21, 2018, issued in Korean Patent Application No. 10-2012-0117548.
Indian Office Action dated Dec. 28, 2018, issued in Indian Patent Application No. 1134/MUMNP/2015.
Korean Office Action dated Jun. 25, 2019, issued in Korean Patent Application No. 10-2012-0117548.
Korean Office Action dated Aug. 26, 2019, issued in Korean Patent Application No. 10-2012-0117548.
European Summons to Attend Oral Proceedings dated Jul. 17, 2019, issued in European Application No. 13849868.8.
European Search Report dated Sep. 3, 2020; European Appln. No. 13 849 868.8-1231.
Chinese Office Action with English translation dated Mar. 25, 2021; Chinese Appln. No. 201911000116.4.
Korean Office Action with English translation dated Dec. 22, 2020; Korean Appln. No. 10-2020-0128208.
European Brief Communication dated Jan. 14, 2021; European Appln. No. 13849868.8-1231 / 2910045.
European Decision to Refuse dated Feb. 8, 2021; European Appln. No. 13 849 868.8-1231.
Korean Office Action with English translation dated Jun. 28, 2021; Korean Appln. No. 10-2020-0128208.

* cited by examiner

300

DEVICE AND METHOD FOR TRANSMITTING ELECTRONIC KEY THEREOF

CROSS-REFERENCE TO RELATED APPLICATION(S)

This application is a continuation of prior application Ser. No. 14/059,799, filed on Oct. 22, 2013, which claims the benefit under 35 U.S.C. § 119(a) of a Korean patent application filed on Oct. 22, 2012 in the Korean Intellectual Property Office and assigned Serial No. No. 10-2012-0117548, the entire disclosure of which is hereby incorporated by reference.

TECHNICAL FIELD

The present disclosure relates to a device and a method for transmitting an electronic key thereof. More particularly, the present disclosure relates to a device and a method for transmitting an electronic key thereof.

BACKGROUND

With recent development of communication technologies, users can easily acquire various types of information. For example, users may receive information from a web server through the Internet, or receive information from various information providing sources using short-range wireless communication technologies.

Specifically, Near Field Communication (NFC) technology is a short-range wireless communication technologies that enables data exchange between two or more terminals adjacent to each other without a physical manipulation. NFC refers to a contactless wireless communication technology for transmitting data with low power within a short range by applying a Radio Frequency Identification (RFID) technology operating at a frequency band of 13.56 MHz.

Data which can be exchanged by NFC may also include an electronic key. The electronic key is attractive to users by virtue of light weight, small size and good portability. However, when the electronic key is transmitted from one device to another device, security of the electronic key may be lowered.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, as aspect of the present disclosure is to provide an embodiment of the present disclosure may not overcome any of the problems described above.

An aspect of the present invention is a device capable of transmitting an electronic key to another device by setting a use condition, and a method for transmitting an electronic key thereof.

In accordance with an aspect of the present disclosure, a method for transmitting an electronic key of a device is provided. The method includes a user command for providing the electronic key to another device, providing a User Interface (UI) for setting a use condition of the electronic key when the user command is received, and transmitting the use condition information set through the UI to the other device together with the electronic key.

According to another aspect of the present disclosure, the providing of the UI may include differentially activating and displaying a plurality of input items for setting the use condition of the electronic key according to a preset criterion.

According to another aspect of the present invention, the preset criterion may be a preset priority for each of the plurality of input items, and the providing of the UI may include gradually activating and displaying the plurality of input items, starting from an input item with a high priority, based on the priorities preset for the plurality of input items, respectively.

According to another aspect of the present invention, the preset criterion may be a lapsed time after the plurality of input items are displayed, and the providing of the UI include gradually activating and displaying the plurality of input items according to the lapsed time after the plurality of input items are displayed.

According to another aspect of the present invention, the preset criterion may be a user gesture input to the device, and the providing of the UI may include gradually activating and displaying the plurality of input items according to intensity that the device is shaken when the user gesture is a shaking motion of shaking the device.

According to another aspect of the present invention, the providing of the UI may comprise displaying the gradually activated input items with sizes relatively reduced.

According to another aspect of the present invention, the transmitting of the use condition information and the electronic key may include one of transferring the electronic key so as to delete the electronic key stored in the device and copying the electronic key so as to maintain the stored state of the electronic key.

According to another aspect of the present invention, the plurality of items may include at least one of a use count, a use time, a use period, and a copy-limit item with respect to the electronic key.

According to another aspect of the present invention, the transmitting of the use condition information and the electronic key may include transmitting the electronic key and information related to the use condition of the electronic key to a Near Field Communication (NFC) reader installed in the another device through NFC.

According to another aspect of the present invention, the electronic key may be stored in the device or an external server.

In accordance with an aspect of the present disclosure, a device is provided. The device include a display configured to display a screen, a communication unit configured to communicate with another device, a user interface unit configured to receive a user command for providing an electronic key to the other device, and a controller configured to provide a user interface for setting a use condition of the electronic key when the user command is received, and to transmit the use condition information set through the user interface to the other device together with the electronic key.

According to another aspect of the present invention, the controller may be configured to differentially activate and display a plurality of input items for setting the use condition of the electronic key according to a preset criterion.

According to another aspect of the present invention, the preset criterion may be a preset priority for each of the plurality of input items, and the controller may be configured to gradually activate and display the plurality of input items, starting from an input item with a high priority, based on the priorities preset for the plurality of input items, respectively.

According to another aspect of the present invention, the preset criterion may be a lapsed time after the plurality of input items are displayed, and the controller may be configured to gradually activate and display the plurality of input items according to the lapsed time after the plurality of input items are displayed.

According to another aspect of the present invention, the preset criterion may also be a user gesture input to the device, and the controller may be configured to gradually activate and display the plurality of input items according to intensity that the device is shaken when the user gesture is a shaking motion of shaking the device.

According to another aspect of the present invention, the controller may control the gradually activated input items to be displayed with sizes relatively reduced.

According to another aspect of the present invention, the controller may transfer the electronic key so as to delete the electronic key stored in the device or copies the electronic key so as to maintain the stored state of the electronic key.

According to another aspect of the present invention, the controller may be configured to transmit the electronic key and information related to the use condition of the electronic key to a NFC reader installed in the another device through NFC tagging.

In accordance with the present disclosure, as aforementioned, when an electronic key is transferred or copied to another device, security of the electronic key may be enhanced.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
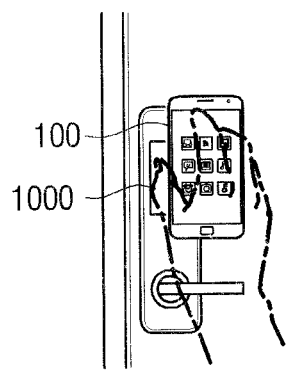
FIGS. 1A and 1B are views illustrating a general operation of a device according to an embodiment of the present disclosure.
Figure 1B:
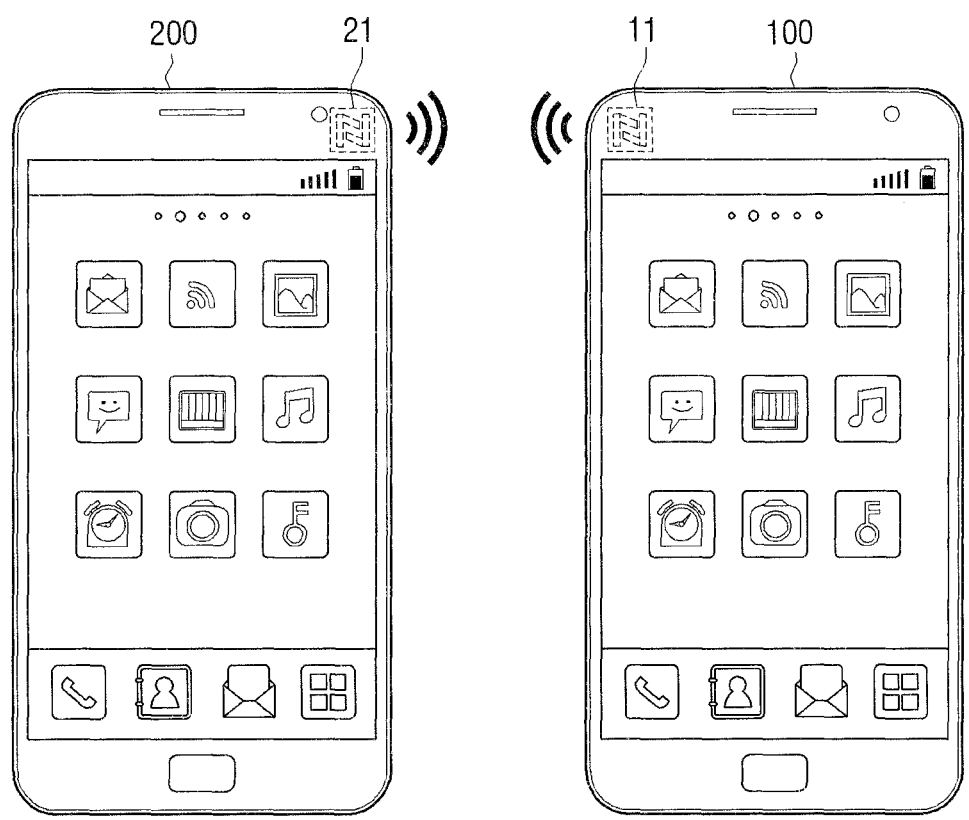

FIGS. 1A and 1B are views illustrating a general operation of a device according to an embodiment of the present disclosure.

Referring to FIG. 1A, a device 100 according to an embodiment of the present disclosure may store electronic key data (hereinafter, referred to as an electronic key), and unlock a target device 1000 using the electronic key. The device 100 may be implemented as various types of devices, having portability and a display function, such as a mobile phone including a smart phone, a Personal Multimedia Player (PMP), a Personal Digital Assistant (PDA), a tablet PC, a navigator, and the like, but the present disclosure may not be limited to this. The device 100 may also be implemented as an Integrated Circuit (IC) card having a display function, and the like.

The electronic key may be implemented as a unique (specific) code to release a lock state by matching a unique code previously stored in a target device (for example, a door lock). The target device 1000 may previously store data in a unique code. When the unique code of the target device 1000 matches a unique code received from the device 100, the target device may be unlocked.

In some cases, the device 100 may generate a second code through a calculation using a predetermined algorithm (for example, hash algorithm) based on its unique code, and transmit the second code to the target device 1000 as an authentication code. In this case, the target device 1000 may also execute a calculation using the same algorithm, generate a second code based on its unique code, and be unlocked according to whether or not the generated second code thereof matches the second code transmitted as the authentication code by the device 100.

FIG. 1A illustrates that the target device 1000 is implemented as a door lock device and the electronic key is implemented as a door key, but the present disclosure is not limited to this configuration. For example, the electronic key may be implemented as various types of electronic keys, such as a door key, a car key, a PC key, a locker key, a drawer key and the like, and an integrated universal key thereof.

A short-range wireless communication may be used for transmitting an electronic key from the device 100 to the target device 1000.

FIG. 1B is a view illustrating a configuration of an electronic key providing system according to an embodiment of the present disclosure.

Referring to FIG. 1B, the device 100 may operate as an information providing source for providing various types of data to another device 200. The device 100 may be configured to include a short-range wireless communication tag 11. When the device 200 is located within a communication-allowable range, the device 100 may transmit data recorded in the short-range wireless communication tag 11 to the another device 200. The short-range wireless communication is described below.

The data recorded in the short-range wireless communication tag 11, as aforementioned, may be the electronic key data. The device 200 may receive the electronic key stored in the device 100 in a transferring or copying manner for use.

The device 200 may acquire an electronic key from the device 100. The device 200 may acquire the electronic key by the short-range wireless communication method. In this case, the device 200 may include a short-range wireless communication reader 21. Accordingly, the short-range wireless communication reader 21 may read data from the short-range wireless communication tag 11 through a local access to the device 100 having the short-range wireless communication tag 11 attached thereto. The local access may include tagging, and refers to a motion that at least one of a short-range wireless communication tag and a reader is moved to a target side (another party side) to be located within a communication-allowable range. Upon moving into the communication-allowable range, the short-range wireless communication reader 21 may read the data recorded in the short-range wireless communication tag 11.

An example of the short-range wireless communication method may be Near Field Communication (NFC). The NFC is a contactless short-range wireless communication technology using 13.56 MHz frequency band. The use of the NFC technology may allow exchange of data when a plurality of terminals are located within a short range less than about 10 cm. Other examples of the short-range wireless communication technology may include barcode scanning, QR code scanning, and the like.

In some cases, the device 100 may include wireless communication modules such as WiFi, Zigbee, Bluetooth, and the like, and execute data exchange with the another device 200 by wireless communication with the another device 200. The device 200 may separately include a wireless communication module (not shown), such as WiFi, Zigbee, Bluetooth, or the like, for communication with the device 100. As another example, a user may connect an external storage medium, such as a Universal Serial Bus (USB) memory or a memory card, to the device 200 to transfer data stored in the external storage medium into the device 200.

As described, the device 100 may transmit the electronic key to the device 200 in various manners. In this case, the device 200 may store the received electronic key for use. Accordingly, the device 200 may include a Hard Disk Drive (HDD) or various types of memories.

When the electronic key stored in the device 100 is transmitted to the device 200, security of the electronic key may not be protected. Accordingly, in order to allow the device 200 to use the electronic key with ensuring the security of the electronic key, a method for restricting (limiting) a function of the electronic key transmitted to the another device 200 may be required.

Accordingly, the device 100 may provide a user interface (UI) screen for setting a use condition of the electronic key transmitted to the device 200. The UI screen may provide a plurality of input items for setting the use condition of the electronic key. The plurality of input items may also be displayed in such a manner of being differentially activated according to preset criteria. For example, an input item requiring a low security level may be displayed first, and an input item requiring a high security level may be displayed last. This is based on a point that reliability for a key transmission command increases according to a lapse of time.

The electronic key transmitted to the device 200 may be restricted from being copied to another device (not shown). However, in some cases, whether or not to allow for copying the electronic key or the number of copying the electronic key may also be set through the UI screen.

The electronic key may be one stored in a memory provided in the device 100 or one stored in a server (not shown). The electronic key stored d in the server (not shown) may be transmitted to the device 200 together with an electronic key use condition, which has been set through the UI screen of the device 100. The server may be an external server outside the device 100 or an embedded server disposed in the device 100.

The relation between a user terminal device 100 and an external server (not shown) is described below.

Figure 2:
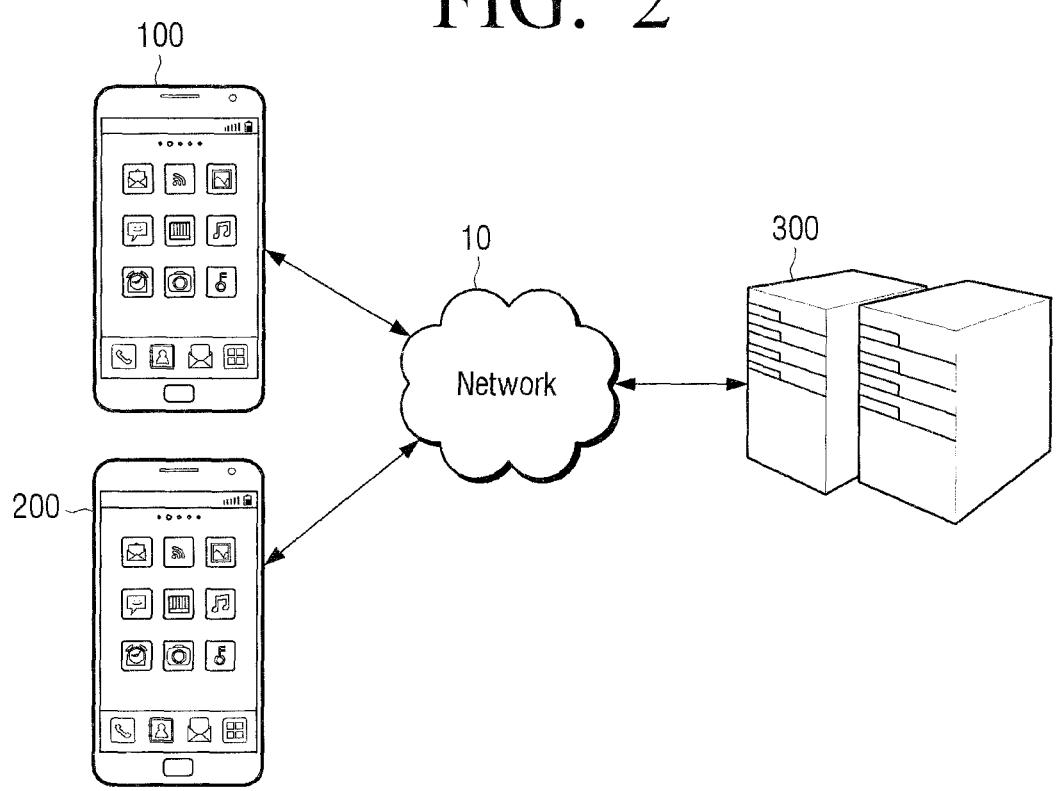
FIG. 2 is a view illustrating a configuration of an electronic key providing system according to an embodiment of the present disclosure.

FIG. 2 is a view illustrating a configuration of an electronic key providing system according to an embodiment of the present disclosure.

Referring to FIG. 2, an electronic key providing system 1000 may include a device 100, another device 200 and a server 300.

Referring to FIG. 2, the device 100 and the device 200 may communicate with each other through the server 300 and a network 10. In the electronic key providing system 1000 with the server 300 interposed between the device 100 and the another device 200, the server 300 may store an electronic key or the server 300 may execute authentication for transmission of the electronic key.

i) When the Server 300 Stores an Electronic Key

The device 100 may transmit electronic key use condition information, which has been input through a UI for setting the use condition of the electronic key, to the device 200 through short-range wireless communication (e.g., NFC), and the server 300 may transmit the stored electronic key to the device 200. The device 200 may receive the electronic key use condition information from the device 100 and the electronic key from the server 300 so as to use the electronic key. This may correspond to a case where a user having the device 100 sets the use condition with respect to the electronic key stored in the server 300, not in the device 100, and transmits the use condition-set electronic key to the device 200.

In this case, the server 300 may store various electronic keys by constructing a database for the various electronic keys based on each user account or device account, and transmit such various electronic keys to the another device 200 in response to a request of the device 100.

The user of the device 100 may thus log in to his or her own account to provide an electronic key stored in the server 300 to the another device 200.

The foregoing various embodiment has illustrated that the electronic key use condition information is transmitted to the device 200 through NFC. In some cases, the electronic key use condition information may also be transmitted to the device 200 via the server 300. In this case, the electronic key transmission may be enabled even when the device 100 and the another device 200 do not have the NFC connection.

ii) When the Server 300 Executes an Authentication Function for Electronic Key Transmission The device 100 may transmit an electronic key and electronic key use condition information, which has been input through a UI for setting the use condition of the electronic key, to the another device 200 using NFC. The server 300 may execute an authentication function for the electronic key transmission.

For example, the electronic key may be transmitted to the device 200 only when the device 100 executes NFC with the device 200 after the user of the device 100 logs in to the server 300 and executes authentication. This may prevent any unauthorized person, other than the user of the device 100, from transmitting the electronic key to the device 200 using the device 100.

In some cases, the server 300 may store information relating to the electronic key transmission for which the authentication has been completed. When the device 200 transmits an electronic key transmission request later, the electronic key and the electronic key use condition information may be transmitted to the device 200 after receiving the approval of the user of the device 100. Consequently, the electronic key transmission may also be enabled if necessary even when the device 100 and the another device 200 do not have the NFC connection.

A configurations of the device and the server with reference to FIGS. 3 to 6 is described below.

Figure 3:
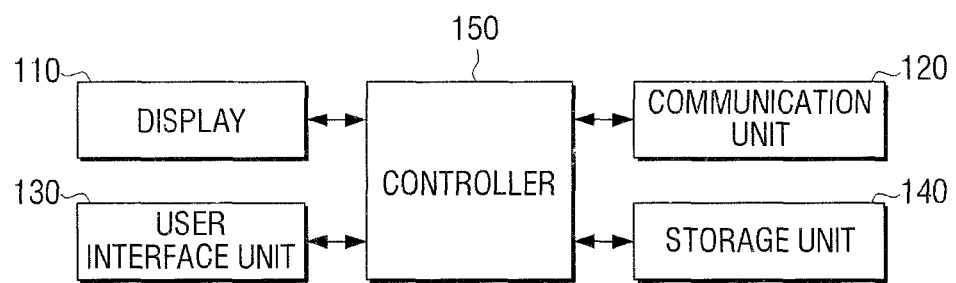
FIG. 3 is a block diagram illustrating a configuration of a device according to an embodiment of the present disclosure.

FIG. 3 is a block diagram illustrating a configuration of a device according to an embodiment of the present disclosure.

Referring to FIG. 3, the device 100 may include a display 110, a communication unit 120, a user interface unit 130, a storage unit 140, and a controller 150.

The display 110 may be configured to display a screen. The screen may include an application execution screen including various objects, such as image, video, text and the like, a Graphic User Interface (GUI) screen, and the like.

The display 110 may display a UI for setting an electronic key use condition. The UI may include a plurality of input items for setting the electronic key use condition. For example, the plurality of input items may include a use count (the number of use, a frequency of use), a use time, a use period, a copy-limit item, and the like with respect to the electronic key.

The display 110 may be implemented as a Liquid Crystal Display (LCD) panel, an Organic Light Emitting Diode (OLED), and the like; however, the present disclosure need not be limited to this. The display 110 may be layered with a touchpad to implement a type of touch screen. The display 110 may be used as the user interface unit 130, as well as an output device. The touch screen may detect a touch input position, a touch input area and even touch input pressure.

The communication unit 120 may execute wireless communication (or NFC) with the another device 200. The communication unit 120 may include an NFC tag and/or an NFC tag reader to execute communication with the another device 200 which includes an NFC tag and/or an NFC tag reader. When the NFC reader is locally accessed to an external device having an NFC tag attached thereto, the NFC reader may read information recorded in the tag of the external device to transmit to the controller 150. The NFC reader may include a wireless frequency module and an antenna coil. The NFC reader may emit electronic waves through the antenna coil. Accordingly, a current may be induced, according to electromagnetic induction, in the NFC tag (not shown) attached to the external device, which is located within an electromagnetic wave-reachable distance. An IC within the NFC tag may be driven to transmit an RF signal including data stored. The wireless frequency module within the NFC reader may receive the RF signal through the antenna coil, execute demodulation and decoding for the received RF signal, and detect the data included in the RF signal. The communication unit 120 may also be implemented into a form including an NFC module, which includes even the NFC tag if necessary.

The communication unit 120 may communicate with the server 300 as necessary. The communication unit 120 may include an NFC module and a separate communication module.

The communication module may allow the communication unit 120 to communicate with the server 300 through a network. For example, the communication unit 120 may communicate with the server 300 using various service protocols, such as Transmission Control Protocol/Internet Protocol (TCP/IP), Hypertext Transfer Protocol (HTTP), Hypertext Transfer Protocol over Secure Socket Layer (HTTPS), XML Remote Procedure Call (XML-RPC), and the like. Operations among the server 300, the device 100 and the another device 200 have been explained with reference to FIG. 2.

The user interface unit 130 may receive various user commands. The user interface unit 130 may receive a user command which is input to transmit an electronic key to another device. For example, when an electronic key providing method according to the present disclosure is implemented as application, the user command for providing the electronic key to another device may correspond to a manipulation for selecting an icon interface corresponding to the application.

The user interface unit 130 may receive a user command input through a UI, which is output on the display 110 under the control of the controller 150 to set an electronic key use condition. For example, the user interface unit 130 may receive a user command for setting an electronic key use count (the number of using an electronic key).

When a method of providing a UI corresponding to an external object is provided in a form of a specific application according to an embodiment of the present disclosure, the user interface unit 130 may receive a user command for manipulating the application.

The storage unit 140 may be a storage medium for storing various programs required to operate the device 100, and implemented as a memory, an HDD and the like. For example, the storage unit 140 may include a Read-Only Memory (ROM) for storing programs for operating the controller 150, a Random Access Memory (RAM) for temporarily storing data generated in response to the operation of the controller 150, and the like. The storage unit 140 may further include an Electrically Erasable and Programmable ROM (EEROM) for storing various reference data, and the like.

The storage unit 140 may store various UI information to be displayed on the display 110. The UI information may be information needed to set the electronic key use condition.

The storage unit 140 may also store the electronic key. The electronic key may sometimes be stored in the server 300.

The controller 150 may execute an overall control of the user terminal device 100. The controller 150 may provide a UI for setting a use condition of an electronic key when a user command for providing the electronic key to the another device 200 is received. The user command may include a related application selection, NFC connection between the device 100 and the another device 200, and the like.

The controller 150 may control a plurality of input items for setting the use condition of the electronic key to be displayed in such a manner of being differentially activated according to a preset criterion. The plurality of input items may include at least one of a use count, a use period, a copy-limit item, and the like with respect to the electronic key. The plurality of input items may be displayed from up to down according to preset priorities, but the present disclosure need not be limited to this arrangement.

The preset criterion for differentially activating the plurality of input items for setting the use condition of the electronic key may include a lapsed time after the plurality of input items are displayed, intensity of a user gesture (user motion) with respect to the device 100, and the like. The order of activating the plurality of input items may be preset priorities, and the priorities may be preset according to necessity of a security level. A high priority may be set for an input item requiring a high security level, and a low priority may be set for an input item requiring a low security level. For example, the low security level may be set for a "copy-count limit" item, and the high security level may be set for "copy-use time limit" item. The priority may be set as a default, and the user may set/change the default priority through a user menu.

The controller 150 may gradually activate and display the input items, starting from an input item having a high priority, according to a lapsed time after the plurality of input items are displayed, or a time when a user command for providing a UI is input. For example, the plurality of input items may be displayed in a deactivated state according to a user command, and then gradually activated and displayed, starting from the input item with the high priority, according to the time lapsed after being displayed in the deactivated state.

When a user gesture is a shaking motion of shaking the device 100, the controller 150 may gradually activate the plurality of input items, starting from an input item with a high priority, according to the intensity that the device 100 is shaken. The controller 150 may activate and display only an input item corresponding to the intensity with which the device 100 is shaken of the plurality of input items. For example, if input items 1, 2 and 3 are displayed, with the input item 1 corresponding to a shaking intensity 1, the input items 1 and 2 corresponding to a shaking intensity 2, and the input items 1, 2 and 3 corresponding to a shaking intensity 3. When a detected shaking intensity is the shaking intensity 1, the input items 1, 2 and 3 may be displayed by activating only the input item 1 and deactivating the other input items 2 and 3. When a shaking input corresponding to the shaking intensity 2 is detected, the input item 2 may additionally be activated and displayed.

The controller 150 may control the plurality of input items to be displayed by relatively reducing sizes of the gradually activated input items. The controller 150 may display a first activated input item with the greatest size, the next activated input item with a smaller size, and the last activated input item with the smallest size.

The controller 150 may also control the device 100 to transmit use condition information set through a provided UI and the electronic key to the another device 200. In this case, the device 200 may use the electronic key based on the electronic key and the use condition information received. For example, upon receiving use condition information for two-time use, the device 200 may use the received electronic key only two times.

When the electronic key transmission to the device 200 is completed, the controller 150 may execute an electronic key transfer for deleting the electronic key stored in the device 100, and an electronic key copy for maintaining a stored state of the electronic key in the device 200.

The controller 150 may transmit the electronic key and information related to the use condition of the electronic key to an NFC reader of the another device 200 through NFC tagging. The electronic key and the information related to the use condition of the electronic key may be transmitted to the device 200 in a manner of tagging to a tag disposed in the another device 200 by use of an NFC tag disposed in the device 100 without a separate menu entry. However, in some cases, the electronic key and the information related to the use condition of the electronic key may be transmitted by entering a tagging mode through a specific UI menu provided in the device 100. A user may activate a specific application provided in the device 100, and execute tagging after entering a screen of the corresponding application.

Alternatively, the controller 150 may transmit the electronic key and the information related to the use condition of the electronic key to the another device 200 through remote control communication. The controller 150 may generate the electronic key and the information related to the use condition of the electronic key in a form of an electronic mail (e.g., email) or a text message to transmit to the device 200.

Information related to the input items included in the UI for setting the electronic key use condition may be previously stored in the device 100, or updated by information received from other sources. For example, a new item may be added or an existing item may be deleted.

The input items included in the UI for setting the electronic key use condition may be the same, irrespective of a type of electronic key. However, in some cases, UIs including different input items according to types of electronic keys may also be provided.

When the use of the electronic key is restricted in the another device due to the use condition being unsatisfied, the controller 150 may receive information about the use restriction from the another device 200.

When the information about the use restriction is received, the controller 150 may display a UI for determining whether to retransmit the electronic key to the another device 200.

When a retransmission command for the electronic key is input, the controller 150 may display a plurality of input items for resetting the use condition of the electronic key.

When the device 200 has actually stored an electronic key, the device 200 may store the electronic key received from the device 100 separately. For example, a user A of the device 100, who lives in an apartment #101, may copy an electronic key for his front door to a user B of the another device 200, who lives in an apartment #102. An electronic key for a front door of #102 of the user B may previously be stored in the device 200. In this case, the electronic key for #102 may be stored in a first specific code storage region, and the corresponding key may be stored as a master key in a corresponding first attribute data storage region. In addition, the electronic key for #101 transmitted from the device 100 may be stored in a second specific code storage region, and the corresponding key may be stored as a copied key in a corresponding second attribute data storage region. Similarly, electronic key use condition information set through a UI screen provided in the device 100 may be stored in the second attribute data storage region, and the electronic key for #101, stored in the second specific code storage region, may be used according to the electronic key use condition information. For example, when an electronic key use count is set to two times, the device 200 may count the number of using the electronic key for #101. When the counted number exceeds two times, the use of the electronic key may be restricted, or the electronic key for #101 stored in the second specific code storage region may be automatically initialized or deleted after the second use.

Figure 4:
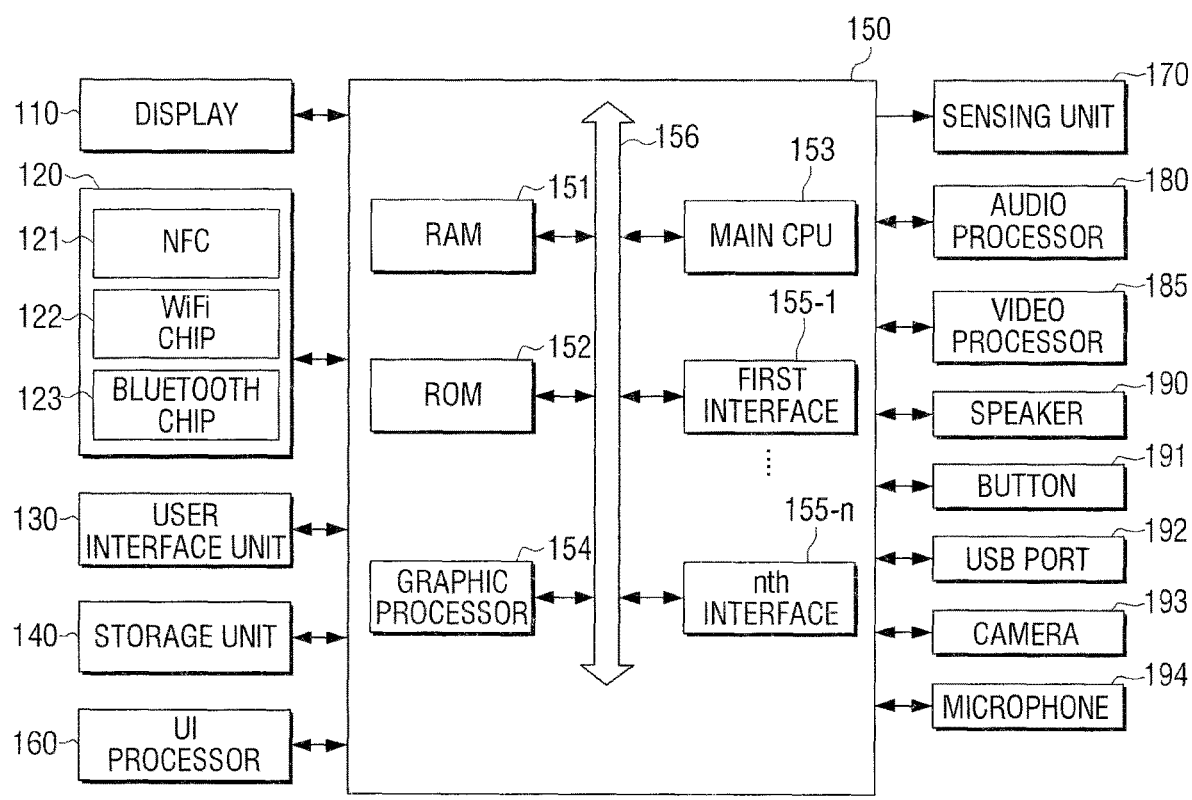
FIG. 4 is a block diagram illustrating a detailed configuration of a user terminal device according to an embodiment of the present disclosure.

FIG. 4 is a block diagram illustrating a detailed configuration of a user terminal device according to an exemplary embodiment of the present disclosure.

Referring to FIG. 4, the device 100 may include the display 110, the communication unit 120, the user interface unit 130, the storage unit 140, the controller 150, a UI processor 160, a sensing unit 170, an audio processor 180, a video processor 185, a speaker 190, a button 191, a USB port 192, a camera 193, and a microphone 194. For simplicity, a detailed description of components described above with respect to FIG. 3, will be omitted.

The communication unit 120 may communicate with various types of external devices according to various types of communication technologies. The communication unit 120 may include various communication chips such as an NFC chip 121, a WiFi chip 122, a Bluetooth chip 123 and the like. The NFC chip 121, the WiFi chip 122 and the Bluetooth chip 123 may communicate according to NFC, WiFi and Bluetooth technologies, respectively.

The NFC chip 121 may operate according to the NFC technology using 13.56 MHz frequency band, among various RF-ID frequency bands, such as 135 kHz, 13.56 MHz, 433 MHz, 860~960 MHz, 2.45 GHz and the like. In addition, the communication unit 120 may further include wireless communication chips executing communication according to various communication standards, such as IEEE, Zigbee, Third Generation (3G), Third Generation Partnership Project (3GPP), Long Term Evolution (LTE), and the like.

For example, the communication unit 120 may execute communication with the device 200 through the NFC chip 121.

The operations of the controller 150 may be enabled by programs stored in the storage unit 140. The storage unit 140 may store various data, such as an Operating System (OS) software module, various application, various data input or set during execution of applications, contents and the like.

In addition, the storage unit 140 may store an electronic key and UI information including a plurality of input items for setting a use condition of the electronic key in accordance with one embodiment of the present disclosure. The UI information may be the same, irrespective of a type of electronic key. Or, the UI information may include different input items according to types of electronic keys.

Other various software modules stored in the storage unit 140 will are described below with reference to FIG. 5.

The UI processor 160 may generate various types of GUIs. The UI processor 160 may process and/or generate various UI screens including image, text, link information and the like into a 2D or 3D form. Here, the UI screen, as aforementioned, may be a UI screen for setting the electronic key use condition to be provided to the another device 200.

The UI processor 160 may deactivate and/or activate each input item constructing the UI screen under the control of the controller 150. The UI processor 160 may also execute tasks, such as 2D/3D conversion, adjusting transparency, color, size, shape and position, highlighting, an animation effect and the like, with respect to UI elements.

The sensing unit 170 may detect various manipulations of the device 100, such as touch, motion, rotation, inclination, pressure, approach, and the like. The sensing unit 170 may include a touch sensor for detecting a touch input. The touch sensor may be a capacitive sensor or a resistive sensor. The capacitive sensor is a sensor which uses a dielectric coated on a surface of the display 110 to calculate a coordinate value of a touch by detecting fine electricity, which is excited to a user's body when a part of the user's body touches the surface of the display 110. The resistive sensor is a sensor which calculates a coordinate value of a touch by detecting a current, which flows in response to upper and lower plates, mounted in the display 110, coming in contact with each other on a touched point when a user touches a screen. As such, the touch sensing unit 170 may be implemented into various forms.

The sensing unit 170 may include a geomagnetic sensor, a gyro sensor, an acceleration sensor and the like for detecting a user gesture with respect to the device 100. The geomagnetic sensor may detect a rotated state and a moving direction of the device 100, the gyro sensor may detect a rotated state of the device 100, and the acceleration sensor may detect an inclination of the device 100.

The sensing unit 170 may detect a user gesture, such as a shaking motion, based on detected values by the geomagnetic sensor, the gyro sensor, and the acceleration sensor.

In addition, when a touch onto a specific button provided on a UI screen is detected by the sensing unit 170, the controller 150 may execute an operation corresponding to a function of the touched button. When a rotation from a vertical mode into a horizontal mode is detected by the sensing unit 170, the controller 150 may rescale or change the UI screen, which has been displayed appropriate for the vertical mode, to be appropriate for the horizontal mode.

In this case, the UI screens corresponding to the vertical mode and the horizontal mode may change in the rescaling manner In some cases, UI elements constructing the respective UI screens corresponding to the vertical mode and the horizontal mode, and information related to size, position and the like of each UI element may be set separately.

The audio processor 180 may be a component which processes audio data. The audio processor 180 may execute various types of processing, such as decoding, amplifying, noise filtering and the like with respect to the audio data.

The video processor 185 may be a component which processes video data. The video processor 185 may execute various image processing, such as decoding of video data, scaling, noise filtering, frame rate conversion, resolution change and the like.

The speaker 190 may output various notification sounds or voice messages as well as various audio data processed by the audio processor 180.

The button 191 may be various types of buttons, such as a mechanical button, a touch pad, a wheel, and the like, which are formed on a particular region of a front surface, a side surface, or a rear surface of an outer appearance of the device 100. For example, the button 191 may be a button for powering on or off the user terminal device 100.

The USB port 192 may execute communication with various external devices or a charging operation using a USB cable.

The camera 193 may capture a still image or a video according to a user's control. The camera 193 may be provided in plurality, such as a front camera and a rear camera.

The microphone 194 may be a component for receiving user's voice or other sound and convert the received user's voice or other sound into audio data. The controller 150 may use the user's voice input through the microphone 194 during a call process or convert the user's voice into audio data to store in the storage unit 140.

When the camera 193 and the microphone 194 are provided, the controller 130 may execute a control operation according to a user's voice input through the microphone 194 or a user motion which is recognized by the camera 193. The user terminal device 100 may operate in a motion control mode or a voice control mode. In the motion control mode, the controller 150 may activate the camera 193 to capture a user's image, track down a change of the user's motion, and execute a corresponding control operation. In the voice control mode, the controller 150 may analyze a user's voice input through the microphone 194, and execute a control operation according to the analyzed user's voice. For example, a tagging mode for transmitting the electronic key to the device 200 according to an embodiment of the present disclosure may also be provided in a manner of voice recognition.

In addition, various external input ports for connection with various external terminals, such as a headset, a mouse, a LAN and the like, may further be included.

The controller 150 may control an overall operation of the device 100 using various programs stored in the storage unit 140. For example, the controller 150 may execute an application stored in the storage unit 140, and construct and display an execution screen of the application. The controller 150 may also play back various content stored in the storage unit 140. The controller 150 may also communicate with the device 200 and the external server 300 through the communication unit 120.

The controller 150 may include a RAM 151, a ROM 152, a main Central Processing Unit (CPU) 153, a graphic processor 154, first to $n^{th}$ interfaces 155-1 to 155-$n$, and a bus 156. The RAM 151, the ROM 152, the main CPU 153, the graphic processor 154, and the first to $n^{th}$ interfaces 155-1 to 155-$n$ may be interconnected via the bus 156.

The first to $n^{th}$ interfaces 155-1 to 155-$n$ may be connected to the aforementioned various components. One of the interfaces may be a network interface connected to an external device via a network.

The main CPU 153 may execute a booting operation using O/S stored d in the storage unit 140 by accessing the storage unit 140. The main CPU 153 may execute various operations using various programs, contents, data and the like stored in the storage unit 140.

The ROM 152 may store command word sets for system booting. When power is supplied in response to an input of a turn-on command, the main CPU 153 may copy the O/S stored in the storage unit 110 into the RAM 151 according to a command word stored in the storage unit 140, execute the O/S and boot the system. Upon completion of the booting, the main CPU 153 may copy various application programs stored in the storage unit 140 into the RAM 151, execute the copied application program, and execute various operations.

The graphic processor 154 may generate a screen including various objects, such as icon, image, text, and the like, using a calculating portion (not shown) and a rendering portion (not shown). The calculating portion may use a control command received from the input device to calculate attribute values, such as a coordinate value, a shape, a size, a color and the like for displaying each object according to a layout of a screen. The rendering portion may generate a screen of various layouts including objects based on the attribute values calculated by the calculating portion. The screen generated by the rendering portion may be output within a display region of the display 110.

FIG. 4 exemplarily illustrates the detailed components of the device 100. Depending on embodiments, some of those components illustrated in FIG. 4 may be omitted or changed, or other components may further be added. For example, the device 100 may further include a Global Positioning System (GPS) receiver (not shown) which receives a GPS signal from a GPS satellite to calculate a current position of the user terminal device 100, a Digital Multimedia Broadcasting (DMB) receiver (not shown0 which receives and processes a DMB signal, and the like.

Figure 5:
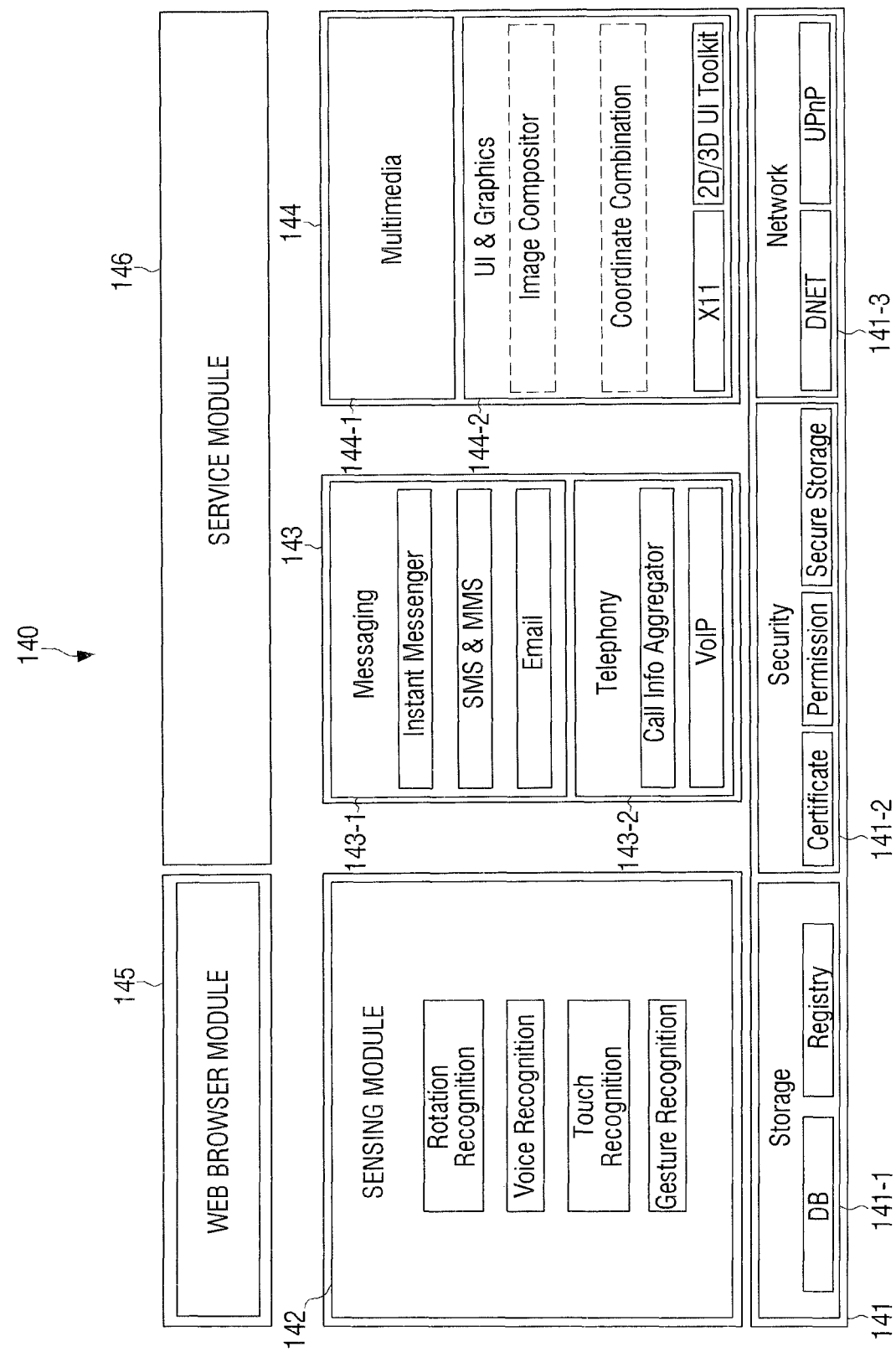
FIG. 5 is a view illustrating a software configuration stored in a storage unit according to an embodiment of the present disclosure.

FIG. 5 is a view illustrating a software configuration stored in a storage unit according to an embodiment of the present disclosure.

Referring to FIG. 5, the storage unit 140 may store software, which includes a base module 141, a sensing module 142, a communication module 143, a presentation module 144, a web browser module 145, and a service module 146.

The base module 141 is a basic module which processes a signal transferred from respective hardware included in the user terminal device 100 to transfer to an upper layer module. The base module 141 may include a storage module 141-1, a security module 141-2, a network module 141-3 and the like. The storage module 141-1 may be a program module which manages a Database (DB) or a registry. The main CPU 133 may access a database within the storage unit 140 using the storage module 141-1, to read various data.

The security module 141-2 may be a program module which supports certification, permission, secure storage, and the like for hardware. The network module 141-3 may be a module for supporting network connection, and include a DNET module, an UPnP module, and the like.

The sensing module 142 may be a module which collects information from various sensors and analyzes and manages the collected information. The sensing module 142 may include a face recognition module, a voice recognition module, a motion recognition module, an NFC recognition module, and the like. For example, the sensing module 142 may use the motion recognition module to recognize a motion such as a shaking motion with respect to the device 100.

The communication module 143 may be a module for performing communication with the exterior. The communication module 143 may include a messaging module 143-1 such as a messenger program, a Short Message Service (SMS) & Multimedia Message Service (MMS) program, an email program and the like, and a phone module 143-2 which includes a call Info aggregator program module, a VoIP module and the like.

The presentation module 144 may be a module for configuring a display screen. The presentation module 144 may include a multimedia module 144-1 which reproduces and outputs multimedia content, and a UI rendering module 144-2 which executes graphics processing. The multimedia module 144-1 may include a player module, a camcorder module, a sound processing module, and the like. Accordingly, the presentation module 144 may carry out an operation of reproducing various multimedia content so as to generate and playback a screen and sound. The UI rendering module 144-2 may include an image compositor module which combines images, a coordinate combination module which combines and generates coordinates on a screen to display an image, an X11 module which receives various events from hardware, and a 2D/3D UI toolkit which provides tools for configuring a UI in a 2D or 3D form. For example, the UI rendering module 144-2 may be used to construct a UI for setting a use condition for an electronic key to be transmitted to the another device 200.

The web browser module 145 accesses a web server through web browsing. The web browser module 145 may include various modules, such as a web view module for configuring a web page, a download agent module for executing downloading, a bookmark module, a webkit module and the like.

The service module 146 may be a module which includes various applications for providing various services. The service module 146 may include various program modules, such as a navigation program, a contents playback program, a game program, an e-book program, a calendar program, an alarm management program, other widgets, and the like. Specifically, the service module 146 may include a service program which provides a UI for setting a use condition for an electronic key according to one embodiment.

FIG. 5 has illustrated various program modules, but the illustrated program modules may also be partially omitted, varied or added according to type and characteristic of the device 100 according to an embodiment of the present disclosure. For example, the program modules may be implemented in a form further including a position-based module which supports a position-based service in cooperation with hardware such as a GPS chip.

Figure 6:
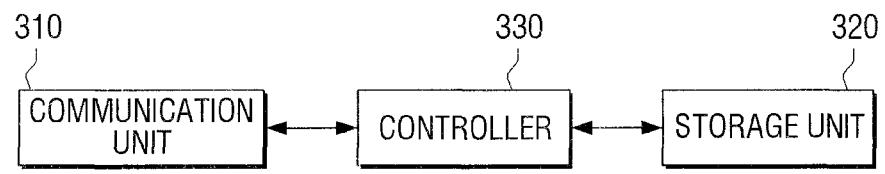
FIG. 6 is a block diagram illustrating a configuration of a server according to an embodiment of the present disclosure.

FIG. 6 is a block diagram illustrating a configuration of a server according to an embodiment of the present disclosure.

Referring to FIG. 6, the server 300 may include a communication unit 310, a storage unit 320, and a controller 330.

The communication unit 310 may communicate with the device 100 and the another device 200. The communication unit 310 may communicate with the device 100 and the device 200 via a network. The communication unit 310 may communicate with the device 100 and the another device 200 using various service protocols, which have been described above in relation to the communication unit 120 of the device 100.

The storage unit 320 may be a storage medium for storing various programs required to operate the server 300, and be implemented as a memory or an HDD. The storage unit 320 may store various electronic keys to be provided to the another device 200. The storage unit 320 may store an electronic key corresponding to a device account or a user account. For example, when receiving a request from a user A who has logged in via the device 100, the electronic key corresponding to the user account may be provided to the another device 200.

The controller 330 may control an overall operation of the server 300. The controller 330 may control the electronic key stored in the storage unit 320 to be transmitted to the device 200 in response to a request by the device 100. The controller 330 may transmit electronic key use condition information received from the device 100 to the device 200. For example, this may correspond to a case where a user of the device 100 sets a use condition for the electronic key stored in the server 300 and desires to provide the set use condition to the device 200. In this case, the user of the device 100 may log in to the account of the device 100 or the user account to transmit an electronic key stored in the corresponding account to the device 200 together with the electronic key use condition information set through the UI screen provided by the device 100. The electronic key use condition information set through the UI screen provided by the device 100 may also be transmitted directly to the another device 200 without passing through the server 300.

In addition, the controller 330 may transmit to the device 200 the electronic key and the electronic key use condition information received from the device 100, in response to a request by the device 100. For example, when NFC between the device 100 and the another device 200 is disabled, the controller 330 may transmit the electronic key stored in the device 100 and the electronic key use condition information set through the UI screen provided by the device 100 to the another device 200 via the server 300. The user of the device 100 may log in to the account of the device 100 or the user account to upload the electronic key and the electronic key use condition information in the corresponding account, and the server 300 may transmit the electronic key and the electronic key use condition information uploaded in the corresponding account to the device 200.

When the electronic key transmitted to the device 200 is used in the device 200, the controller 330 may receive corresponding used state information from the device 200 to forward to the device 100. The used state information may include electronic key used time, a used place, an accumulative use count, and the like.

The server 300 may authenticate NFC between the device 100 and the another device 200. The electronic key transmission from the device 100 to the device 200 may be normally executed only when the server 300 authenticates the NFC.

Figure 7:
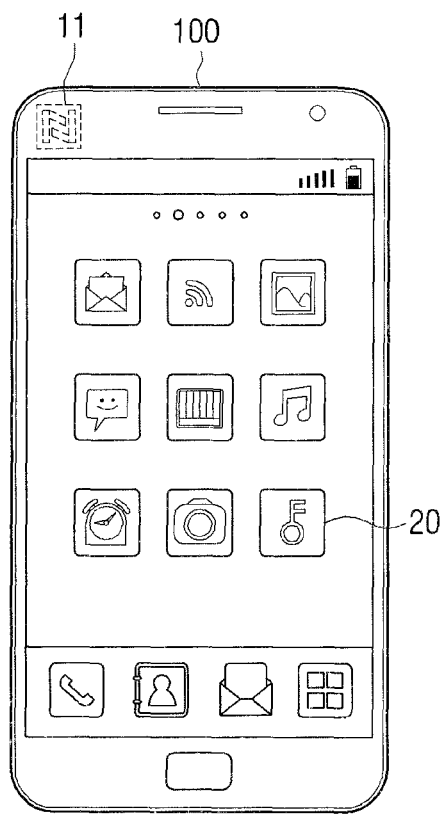
FIG. 7 is a view illustrating a control method for a device according to an embodiment of the present disclosure.

FIG. 7 is a view illustrating a control method for a device according to an embodiment of the present disclosure.

Referring to FIG. 7, a control method for a device in accordance with an embodiment of the present disclosure may be implemented in a form of an application. A UI screen for setting an electronic key use condition may be provided by executing an application 20 which is provided in a form of an icon interface on a screen of the device 200. For example, when communicating with the device 200 before or after a user executes the corresponding application 20, a UI screen for setting a use condition of an electronic key to be provided to the another device 200 may be output by the device 100.

Figure 8A:
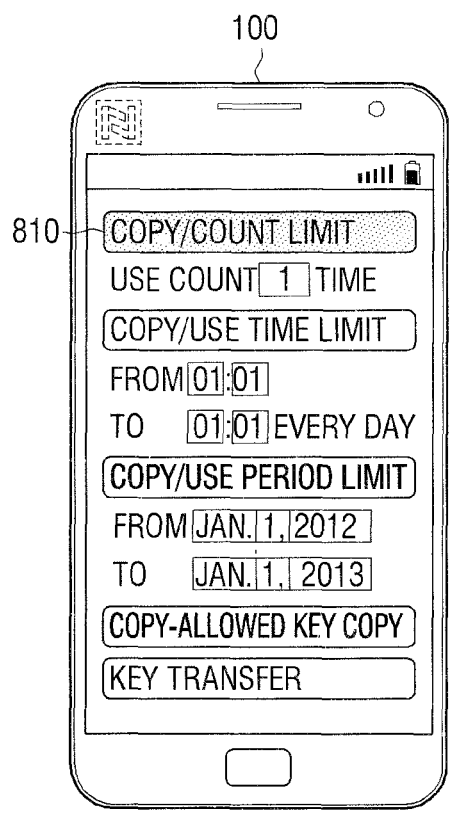
FIGS. 8A, 8B, and 8C are views illustrating a User Interface (UI) providing method according to an embodiment of the present disclosure.
Figure 8B:
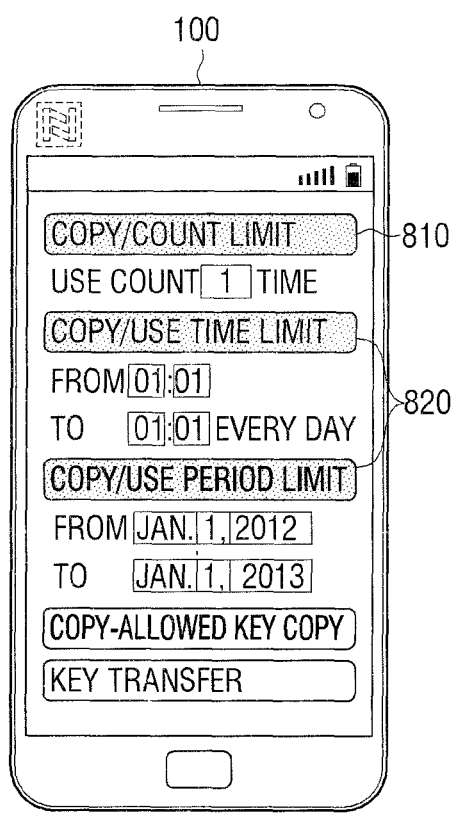
Figure 8C:
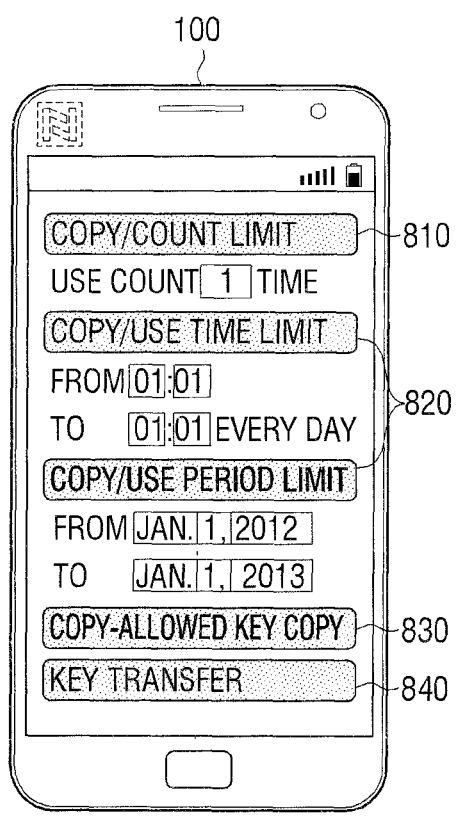

FIGS. 8A, 8B, and 8C are views illustrating a UI providing method according to an embodiment of the present disclosure.

Referring to FIGS. 8A to 8C, a UI for setting a use condition of an electronic key to be transmitted to the device 200 may include a plurality of input items, such as "copy/count limit," "copy/use time limit," "copy/use period limit," "copy of copy-allowed key," and "key transfer."

The plurality of input items may not be activated at once, but may be preferentially (differentially) activated and displayed according to a preset criterion. The preset criterion may be a lapsed time after the UI screen is displayed, intensity of a user gesture with respect to the device 100, or the like. Accordingly, when the user gesture is a shaking motion of shaking the device 100, the plurality of input items may be gradually activated and displayed according to the intensity that the device 100 is shaken.

The order of activation may be preset. For example, a priority preset for each input item may be the order of activation, and an input item with a lower priority may be displayed first. For example, as illustrated in FIG. 8A, when a UI screen is displayed in response to a user command, only "copy/count limit" item 810 with the lowest priority may be activated. In case of copying an electronic key, the "copy/count limit" item 810 may be an item for setting a use count (the number of use). When the item is set to "two times," the device 200 may be allowed to use the electronic key only two times.

Afterwards, according to the preset criterion, as illustrated in FIG. 8B, "copy/use time limit" and "copy/use period limit" items 820 having the next priority may be activated. The "copy/use time limit" item may be an item for setting a use time in case of copying the electronic key, and the device 200 may be allowed to use the copied electronic key only at a preset time. The "copy/use period limit" item may be an item for setting a use period (period of use or terms of use) in case of copying the electronic key, and the device 200 may be allowed to use the copied electronic key only during a preset period of time. When the preset time expires, the use of the electronic key may be limited.

Afterwards, according to the preset criterion, as illustrated in FIG. 8C, "copy of copy-allowed key" and "key transfer" items 830 and 840 with the highest priority may be activated. The "copy of copy-allowed key" item may be an item for copying the electronic key with a condition, which has been set according to the copy items 810 and 820, and the "key transfer" item 840 may be an item for transferring the electronic key stored in the device 100 to the another device 200. The transfer may be distinguished from the copy, which the electronic key stored in the device 100 remains still, in the aspect that the electronic key stored in the device 100 is deleted.

The plurality of input items may be differentially activated according to the priorities of the respective input items, resulting in improving security of the electronic key upon copying or transferring the electronic key.

Figure 9A:
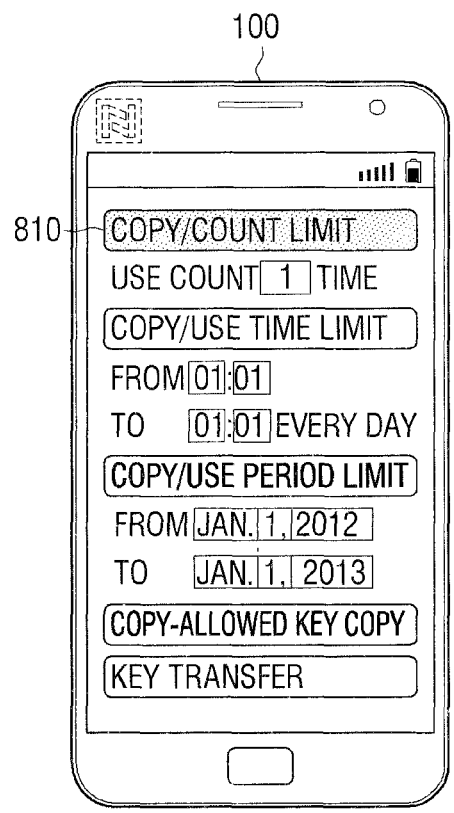
FIGS. 9A, 9B, and 9C are views illustrating a UI providing method according to an embodiment of the present disclosure.
Figure 9B:
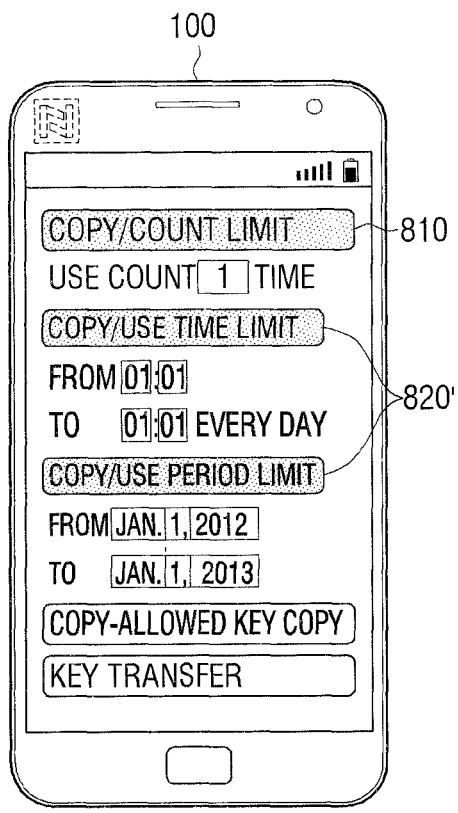
Figure 9C:
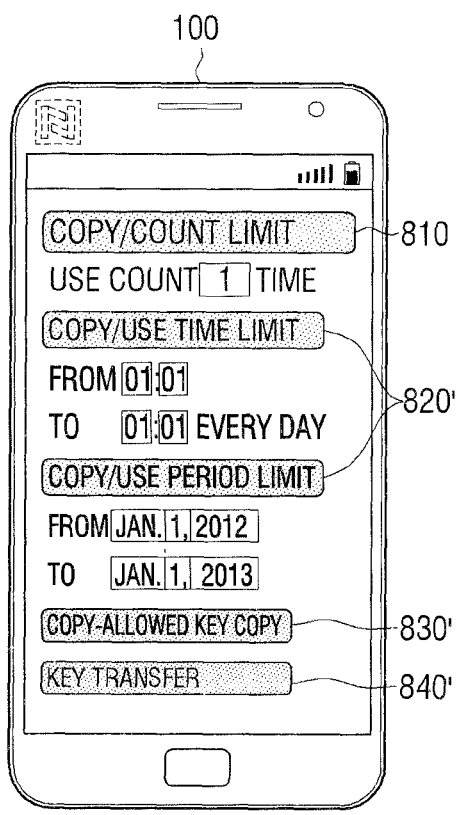

FIGS. 9A, 9B, and 9C illustrate a UI providing method according to an embodiment of the present disclosure.

Referring to FIGS. 9A to 9C, a display state of each input item may change according to priorities of a plurality of input items included in a UI for setting a use condition of an electronic key to be transmitted to the device 200. For example, an input item needing a high security level may be controlled to have lowered visibility and/or accessibility so as to relatively make it more difficult to select a function related to the corresponding input item than an input item needing a low security level.

As illustrated in FIG. 9A, when a UI screen for setting an electronic key use condition is displayed in response to a user command, only "copy/count limit" item 810 with the lowest priority may be activated. Here, the input item may be displayed in a shape with the same size as a displayed size.

According to a preset criterion, as illustrated in FIG. 9B, "copy/use time limit" and "copy/use period limit" items 820' having the next priority may be activated. The corresponding input items may be displayed with a smaller size than the "copy/count limit" item 810 activated in FIG. 9A.

Afterwards, according to the preset criterion, as illustrated in FIG. 9C, "copy of copy-allowed key" and "key transfer" items 830' and 840' with the highest priority may be activated. The corresponding input items may be displayed with a smaller size than the "copy/use time limit" and "copy/use period limit" items 820 activated in FIG. 9B.

Accordingly, the plurality of input items may be displayed to be distinguished from one another in view of visibility and/or accessibility according to each priority.

FIG. 9 shows that an input item is activated with a size reduced at a time point when the corresponding input item is activated after a UI screen is first displayed, but this is merely illustrative. According to another embodiment, each input item may also be displayed with a different size at a time point when a UI screen is first displayed. Alternatively, every input item may be displayed in an activated state when a UI screen is first displayed, in such a manner that each input item has a different size according to its priority. This may not also be departing from the scope of the present disclosure that a plurality of input items are differentially displayed according to a preset criterion.

Figure 10A:
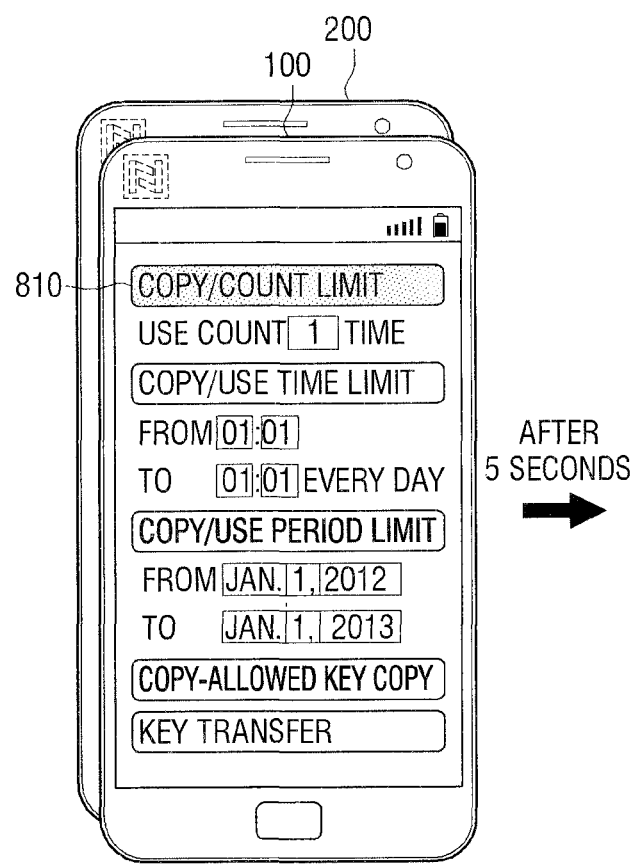
FIGS. 10A, 10B, 10C are views illustrating a UI providing method based on a lapse of time according to an embodiment of the present disclosure.
Figure 10B:
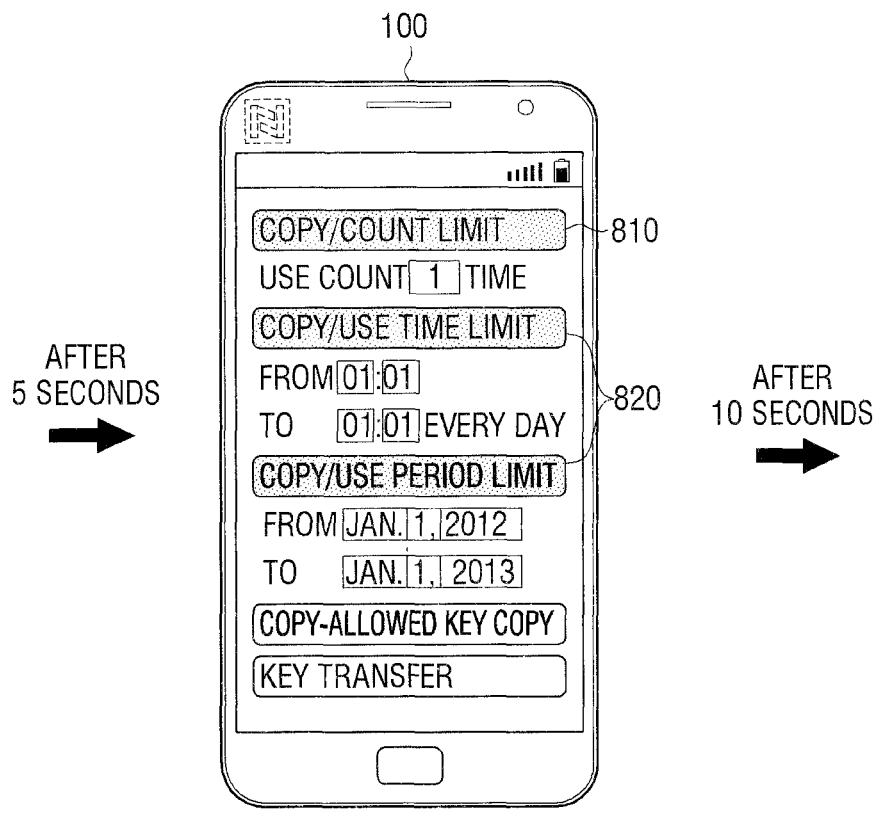
Figure 10C:
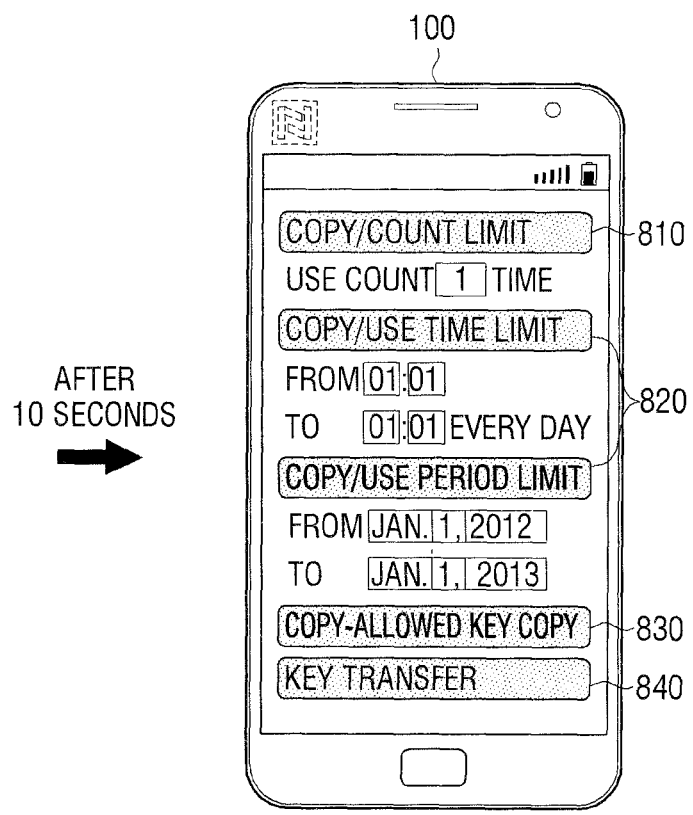

FIGS. 10A, 10B, and 10C are views illustrating a UI providing method based on a lapse of time according to an embodiment of the present disclosure.

Referring to FIGS. 10A to 10C, a preset condition for displaying a plurality of input items, which are included in a UI for setting a use condition of an electronic key to be transmitted to the another device 200 in a distinguishing manner, may be a lapsed time after the UI screen is displayed.

The embodiment illustrated in FIGS. 10A to 10C illustrate a case of providing a UI screen, on which only an input item having the lowest priority is activated, of a plurality of input items, according to a user command for transmitting an electronic key from the device 100 to the another device 200.

As illustrated in FIG. 10A, when a UI screen for setting an electronic key use condition is displayed according to a user command, only "copy/count limit" item 810 with the lowest priority may be activated.

Then, when a preset unit time (for example, 5 seconds) is lapsed, as illustrated in FIG. 8B, "copy/use time limit" and "copy/use period limit" items 820 having the next priority may be activated.

When another preset unit time (for example, 5 more seconds) is lapsed, as illustrated in FIG. 8C, "copy of copy-allowed key" and "key transfer" items 830 and 840 with the highest priority may be activated.

The input items 830 and 840 by which transferring or copying of the electronic key is immediately executed may be temporally slowly activated so as to enhance security of the electronic key while copying or transferring the electronic key.

The foregoing embodiment has illustrated that the input items are sequentially activated at the same unit time, but this is merely illustrative. The unit time may also be differentially set. For example, after five seconds from the screen illustrated in FIG. 10A, another input item may be activated as illustrated on the screen of FIG. 10B. After ten more seconds, namely, when 15 seconds are lapsed after the UI screen is displayed, another input item may be activated as illustrated on the screen of FIG. 10C.

Figure 11A:
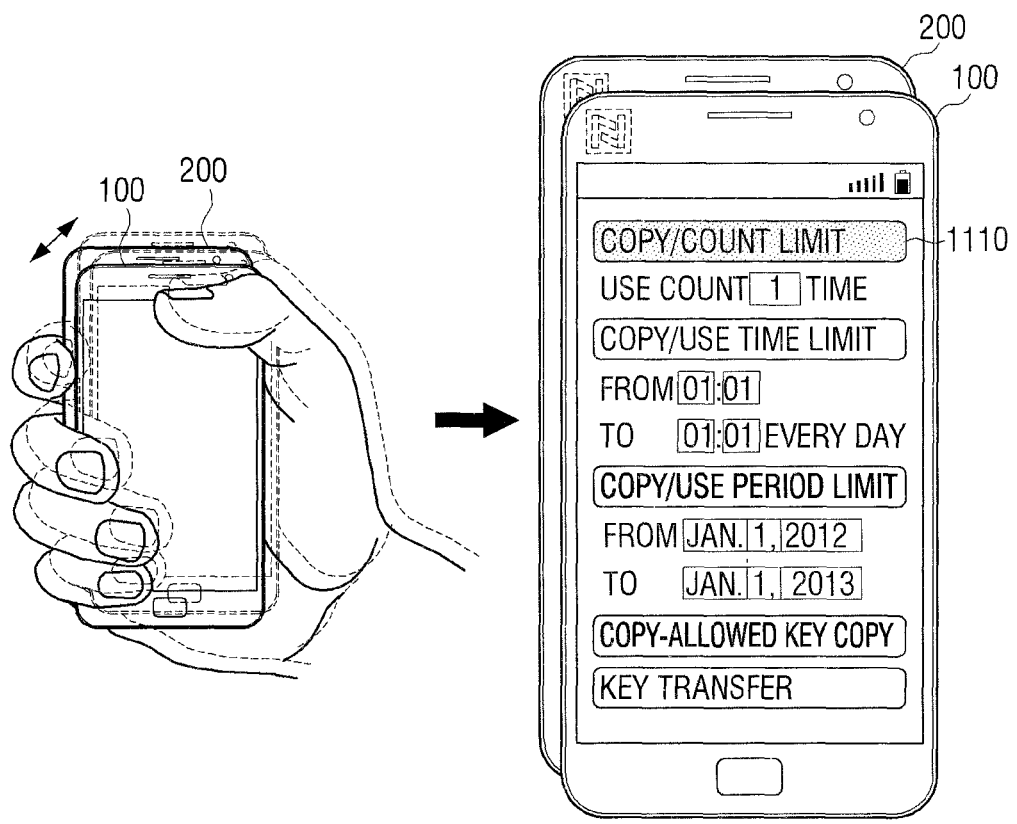
FIGS. 11A, and 11B are views illustrating a UI providing method based on a user motion according to an embodiment of the present disclosure.
Figure 11B:
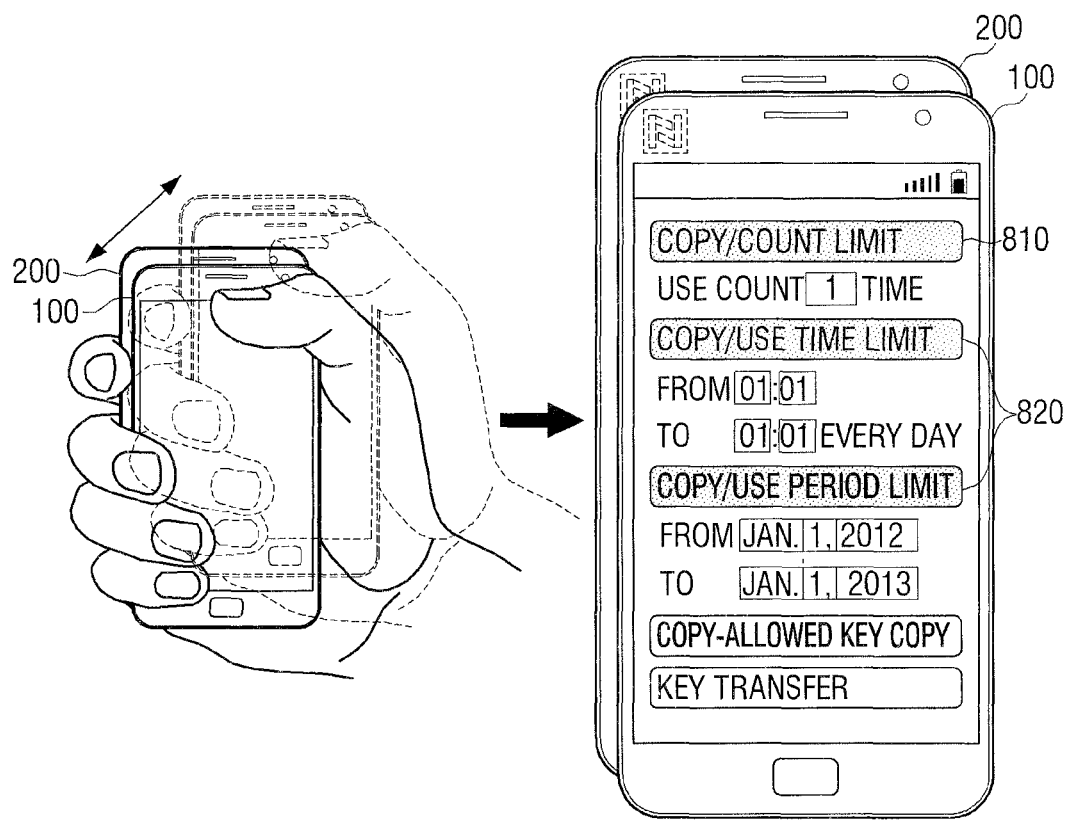

FIGS. 11A and 11B are views illustrating a UI providing method based on a user motion according to an embodiment of the present disclosure.

Referring to FIGS. 11A and 11B, a preset condition for differentially displaying a plurality of input items, which are included in a UI for setting a use condition of an electronic key to be transmitted to the device 200, may be intensity of a user motion. The embodiment illustrated in FIGS. 11A and 11B illustrates a case of providing a UI screen on which a plurality of input items are all activated according to a user command (for example, NFC connection between two devices) for transmitting an electronic key from the device 100 to the device 200.

When a user motion, for example, a shaking motion for activating a plurality of input items displayed in a deactivated state is input, at least one input item with a priority corresponding to the intensity of the shaking motion, of the plurality of input items, may be activated.

For example, as illustrated in FIG. 11A, when the intensity of the shaking motion is below a preset first level, only "copy/count limit" item 810 with the lowest priority may be activated.

As illustrated in FIG. 11B, when the intensity of the shaking motion is over the first level, the "copy/count limit" item 810 having the lowest priority and "copy/use time limit" and "copy/use period limit" items 820 having the next priority may be activated.

Although not shown, when the intensity of the shaking motion is over a preset second level, which is higher than the first level, every input item included in the UI screen may be activated.

Figure 12:
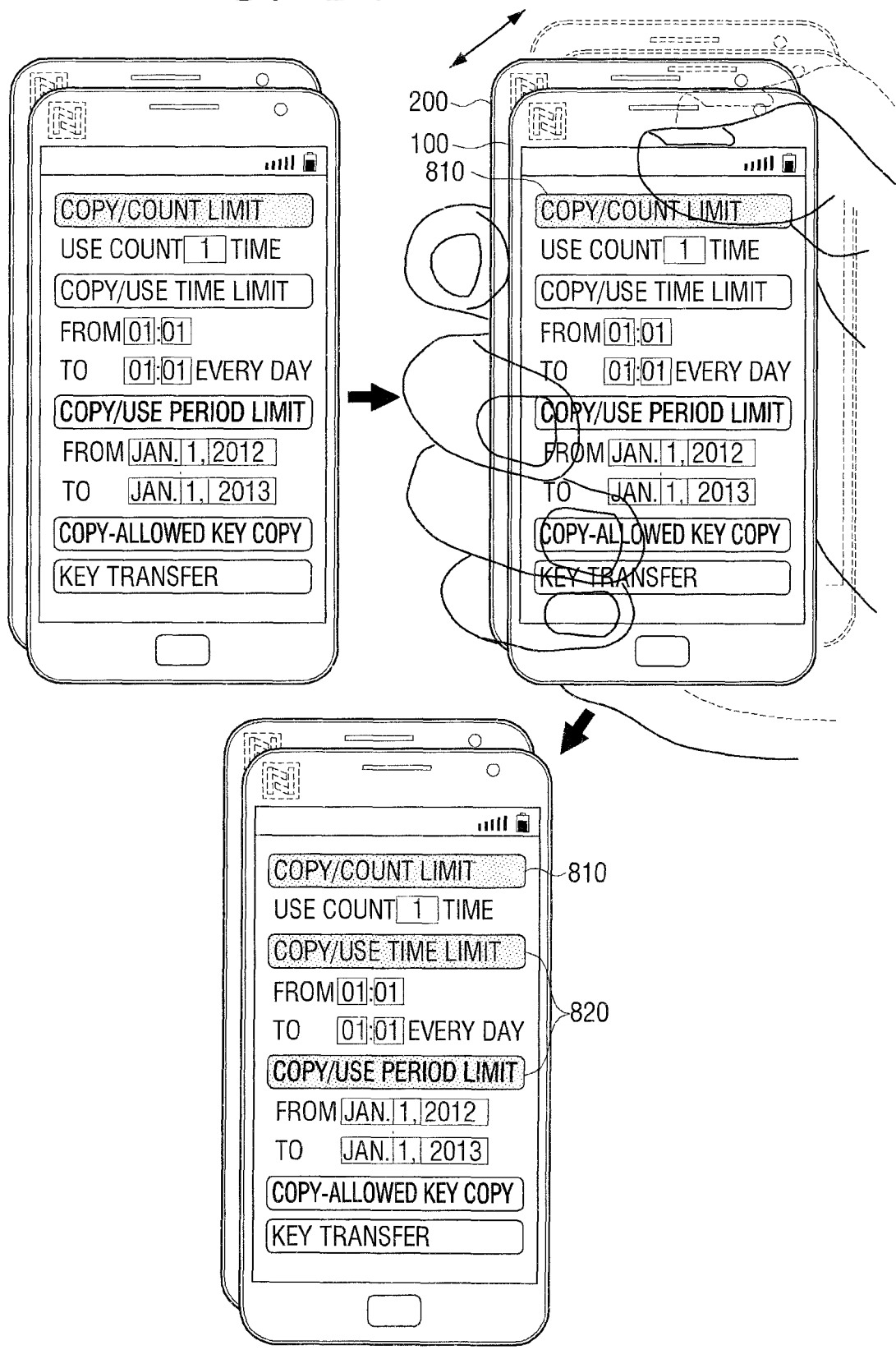
FIG. 12 is a view illustrating a UI providing method based on a user motion according to an embodiment of the present disclosure.

FIG. 12 is a view illustrating a UI providing method based on a user motion according to an embodiment of the present disclosure.

Referring to FIG. 12, when a user motion is input in a state that some of a plurality of input items included in a UI screen have been activated, at least one input item corresponding to intensity of the input user motion may be activated.

For example, when a shaking motion is input while only the "copy/count limit" item 810 with the lowest priority, of the plurality of input items, has been activated, the "copy/use time limit" and "copy/use period limit" items 820 corresponding to the intensity of the input shaking motion may be activated. When an additional user motion is input in a state that some of input items have been activated according to the previously input user motion, at least one input item corresponding to the additional user motion may further be activated.

The activated state of some of the plurality of input items may not be limited to the case where the corresponding user motion is input, as illustrated in FIG. 11A. In some cases, an input item with the lowest priority may basically be displayed according to a user motion for displaying a UI screen for setting an electronic key use condition.

Figure 13A:
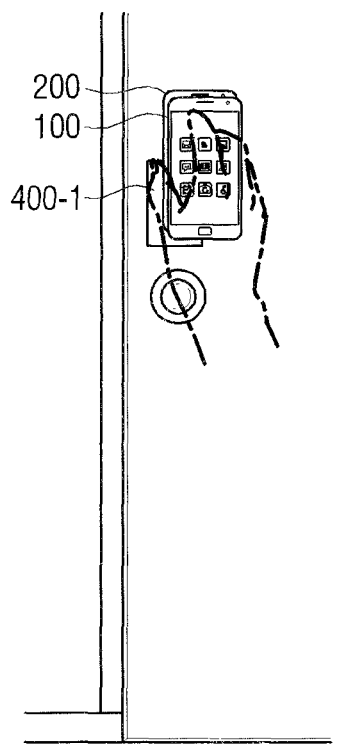
FIGS. 13A, 13B, and 13C are views illustrating an authentication method for an electronic key transmission according to an embodiment of the present disclosure.
Figure 13B:
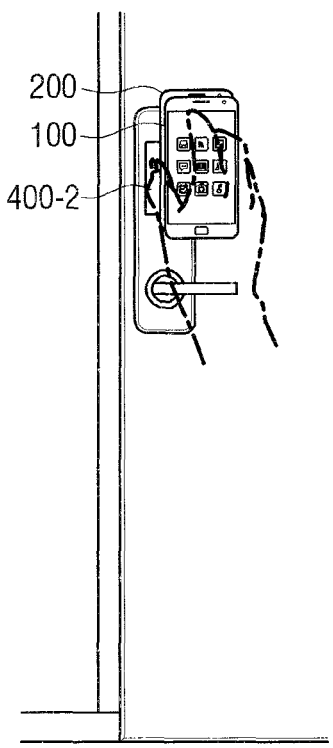
Figure 13C:
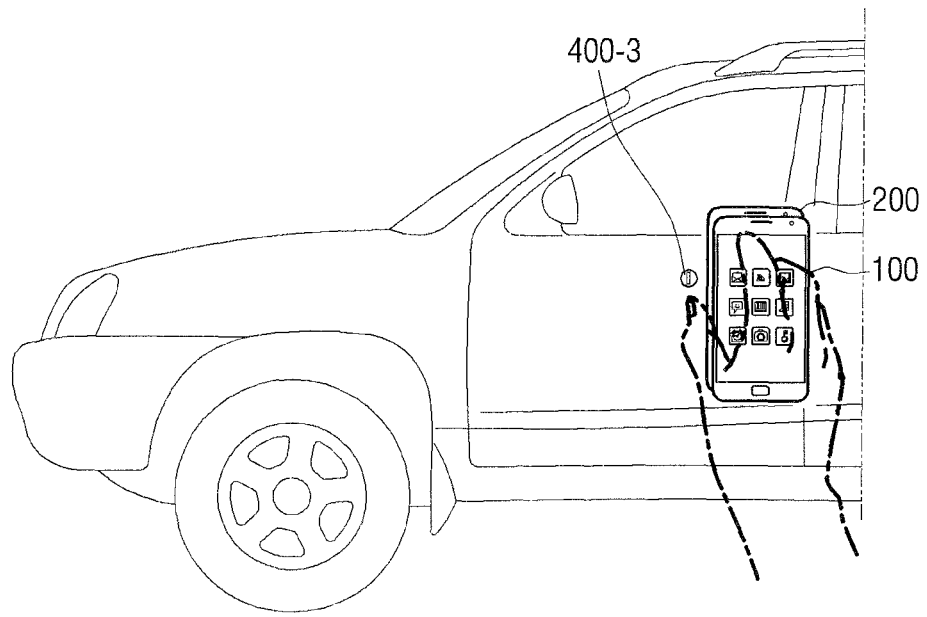

FIGS. 13A, 13B, and 13C are views illustrating an authentication method for an electronic key transmission according to an embodiment of the present disclosure.

Referring to FIGS. 13A, 13B, and 13C, when desiring to transmit an electronic key stored in the device 100 to the another device 200, an authentication process may be executed by a separate authentication device (or server) 400-1, 400-2, 400-3. The transfer and/or copy of the electronic key may be executed only in a state that the device 100 and the another device 200 are connected to the authentication device 400-1, 400-2, 400-3. When an NFC connection is used for connecting the device 100 and the another device 200 to the authentication device 400-1, 400-2, 400-3, the authentication device 400-1, 400-2, 400-3 may be implemented to include an NFC reader.

For example, as illustrated in FIG. 13A, when desiring to transmit an electronic key for a front door from the device 100 to the device 200, the electronic key stored in the device 100 may be transmitted to the another device 200 only after the authentication is executed by the authentication device 400-1 separately installed in the front door. The authentication for the electronic key transmission may be executed in various manners. For example, identification information related to the device 100 may be received and then authenticated; however, the present disclosure need not be limited to this situation.

In addition, as illustrated in FIG. 13B, a door lock 400-2 installed on the front door may directly execute the function of the authentication device. Similarly, as illustrated in FIG. 13C, a device 400-3 mounted to a vehicle door may execute the authentication for the copy or transfer of a car key.

In the embodiment illustrated in FIGS. 13A to 13C, the authentication device 400-1, 400-2, 400-3 executes the authentication. However, in some cases, an authentication server (not shown) which executes communication with the authentication device 400-1, 400-2, 400-3 may execute the authentication function. Alternatively, the transfer and/or copy of the electronic key may be executed only when the device 100 and the another device 200 are connected to the same AP.

Figure 14A:
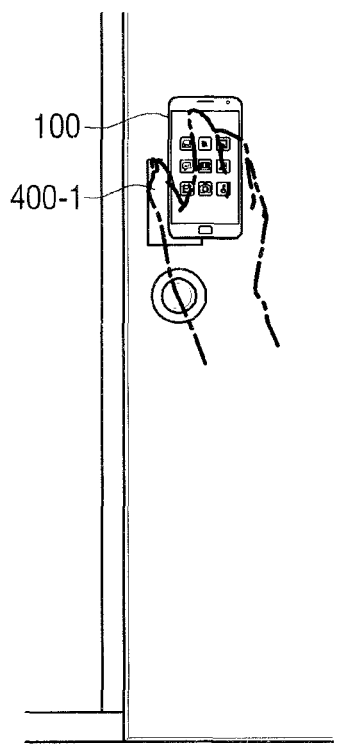
FIGS. 14A, 14B, and 14C are views illustrating an authentication method for an electronic key change according to an embodiment of the present disclosure.
Figure 14B:
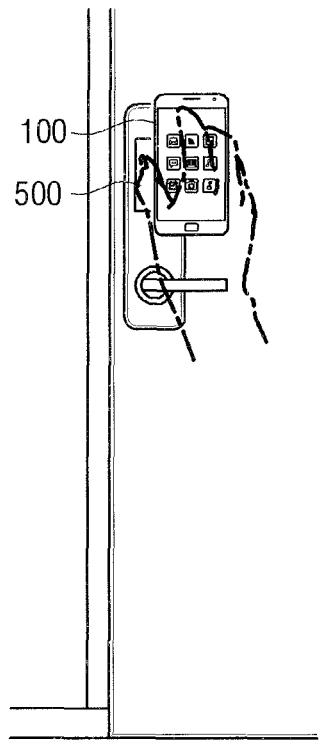
Figure 14C:
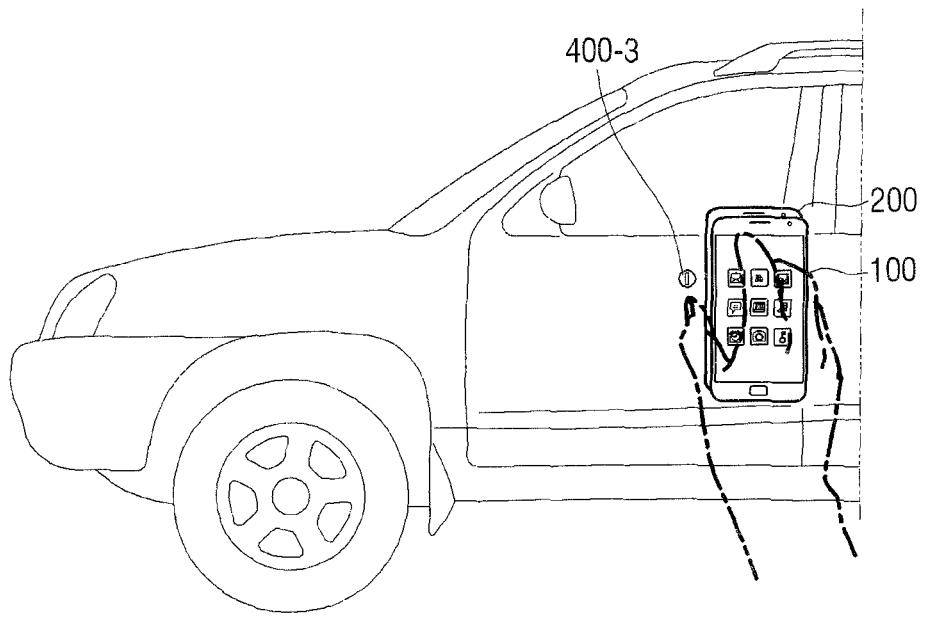

FIGS. 14A, 14B, and 14C are views illustrating an authentication method for an electronic key change according to an embodiment of the present disclosure.

According to one embodiment of the present disclosure, when additional information such as a fingerprint/gesture is linked to an electronic key, the additional information linked to the electronic key may be changed by an authentication device.

For example, a fingerprint of a user A may be linked to the electronic key so as to execute a function of a front door key. In this case, when desiring to change the fingerprint of the user A linked to the electronic key to a fingerprint of a user B, information related to the fingerprint linked to the electronic key may be changed while executing an NFC with an authentication device 500 (e.g., a door lock device using a front door key). In another embodiment, a server cooperating with the authentication device 500 may execute an authentication function with respect to the change in additional information linked to the electronic key.

Figure 15:
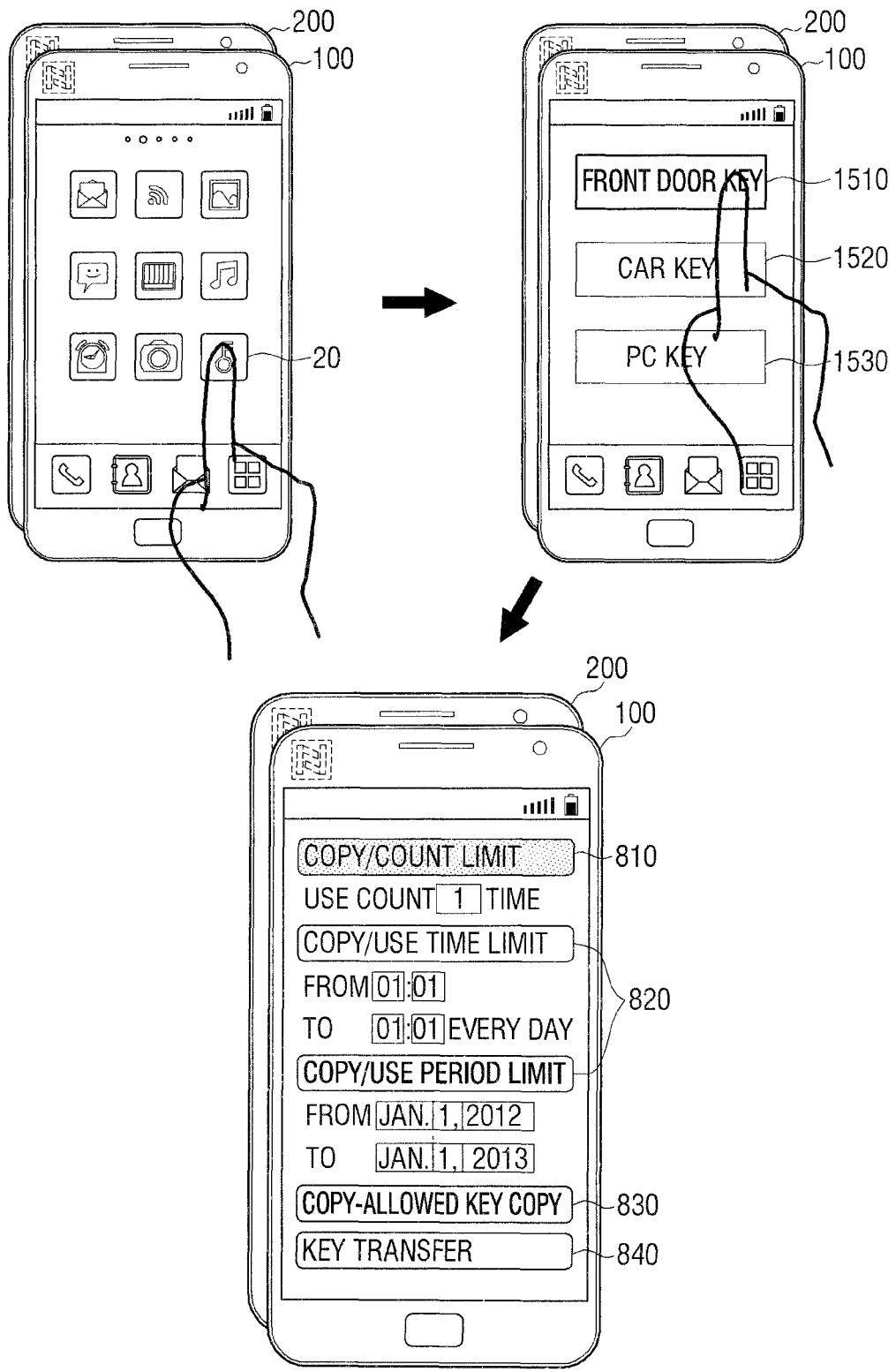
FIG. 15 is a view illustrating a UI providing method according to an embodiment of the present disclosure.

FIG. 15 is a view illustrating a UI providing method according to an embodiment of the present disclosure.

Referring to FIG. 15, when a plurality of electronic keys are stored in the device 100, a UI screen for selecting an electronic key of the plurality of electronic keys, which is desired to be transmitted to the device 200, may be provided according to a user command for transmitting the electronic key stored in the device 100 to the another device 200.

For example, when an application 20 providing a UI screen service for setting an electronic key use condition is executed, a UI for selecting the electronic key stored in the device 100 may be displayed. The UI may include electronic key items stored in the device 100, such as a front door key 1510, a car key 1520, a PC key 1530, and the like. When a user selects an item, such as the front door key 1510, a UI screen for setting a use condition of the front door key 1510 to be transmitted to the another device 200 may be displayed.

In the embodiment illustrated in FIG. 15, the application 20 seems to be driven in a state that the device 100 and the another device 200 are located close to each other, so as to execute NFC, but this is merely illustrative. According to another embodiment, the application 20 may be executed in the device 100. The device 100 may execute the NFC with the another device 200 after the front lock key 1510 is selected and a use condition is set, so as to transmit the selected front door key and the set use condition information.

FIGS. 16A, 16B, 16C, and 16D are a views illustrating types of notification messages according to an embodiment of the present disclosure.

Figure 16A:
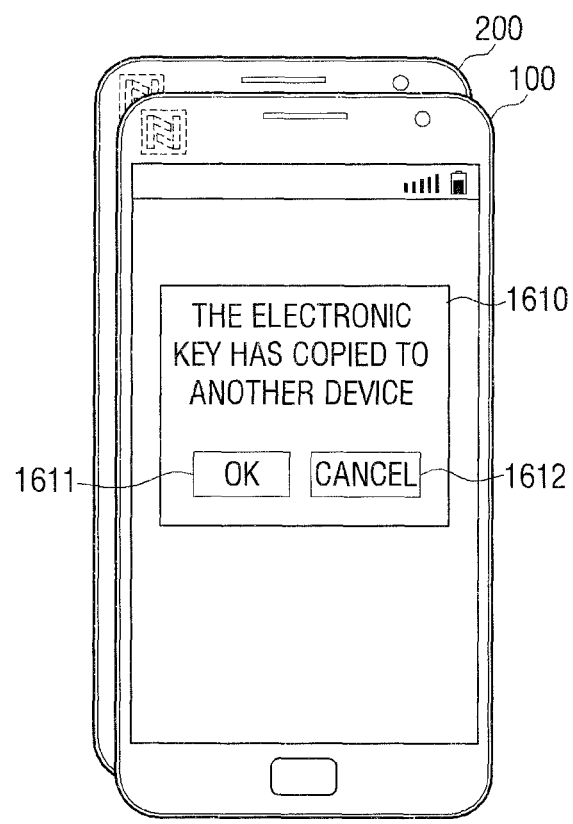
FIGS. 16A, 16B, 16C, and 16D are views illustrating types of notification messages according to an embodiment of the present disclosure.

Referring to FIG. 16A, when an electronic key stored in a device 100 (hereinafter referred to as a device A) is copied to another device 200 (hereinafter referred to as a device B), a message window 1610 notifying a user that the electronic key has been completely copied may be displayed on the device A 100. The user may select an OK button 1611 included in the message window 1610 such that the message window 1610 may disappear from the screen.

Although not shown, when the electronic key has been used in the device B 200, information related to the use of the electronic key may be transmitted to the device A 100 to notify the corresponding information to the user of the device A 100.

Figure 16B:
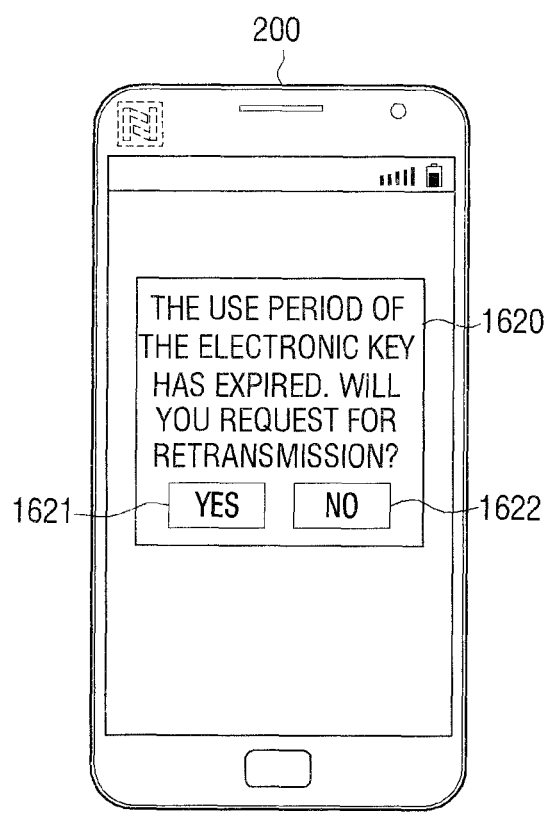

Referring to FIG. 16B, when a use period of the electronic key transmitted to the device B 200 has expired, a message window 1620 for inquiring a retransmission request of the corresponding electronic key may be displayed on the device B 200. Even in a situation that the device B 200, which has been provided with the electronic key from the device A 100 before, is unable to establish the NFC connection, the device B 200 may be able to request retransmission of the electronic key from the device A 100.

For example, when a "Yes" button 1621 included in the message window 1620 displayed on the device B 200 is selected, the device B 200 may request for retransmission of the electronic key, which has been transmitted before, from the device A 100. When a "No" button 1622 is selected, the device B 200 may cancel the retransmission attempt.

Figure 16C:
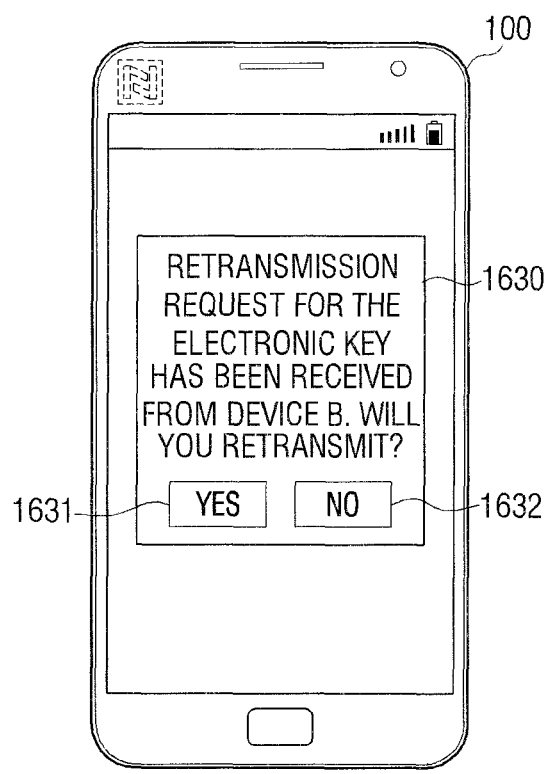
Figure 16D:
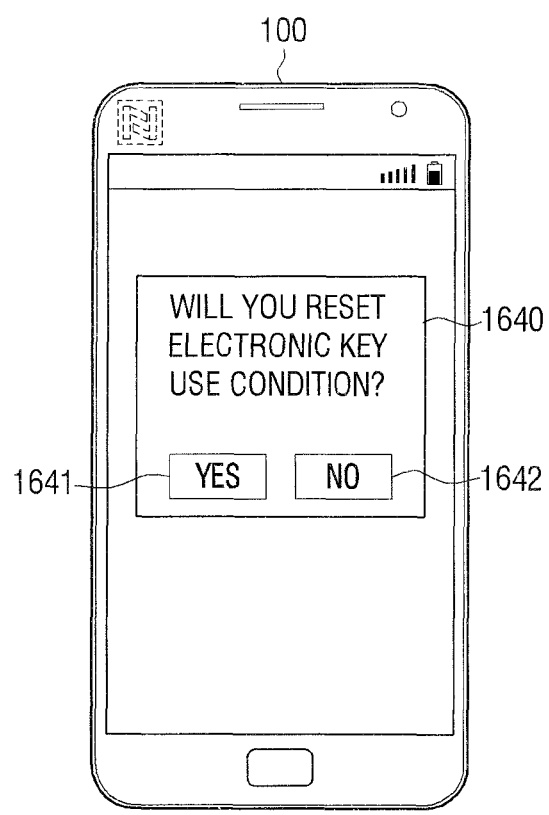

In this case, as illustrated in FIG. 16C, a message window 1630 which notifies that the device B 200 has transmitted the electronic key retransmission request may be displayed on the device A 100. Also, the message window 1630 may include buttons 1631 and 1632 for selecting whether or not to retransmit the electronic key.

When the "Yes" button 1631 is selected on the message window 1630 illustrated in FIG. 16C, a message window 1640 which inquires whether to reset the electronic key use condition may be displayed. When a "Yes" button 1641 is selected on the message window 1640, a UI for setting a use condition of the electronic key to be retransmitted may be displayed. On the other hand, when the "No" button 1642 is selected on the message window 1640, the electronic key may be retransmitted to the device B 200 together with the existing use condition.

Figure 17:
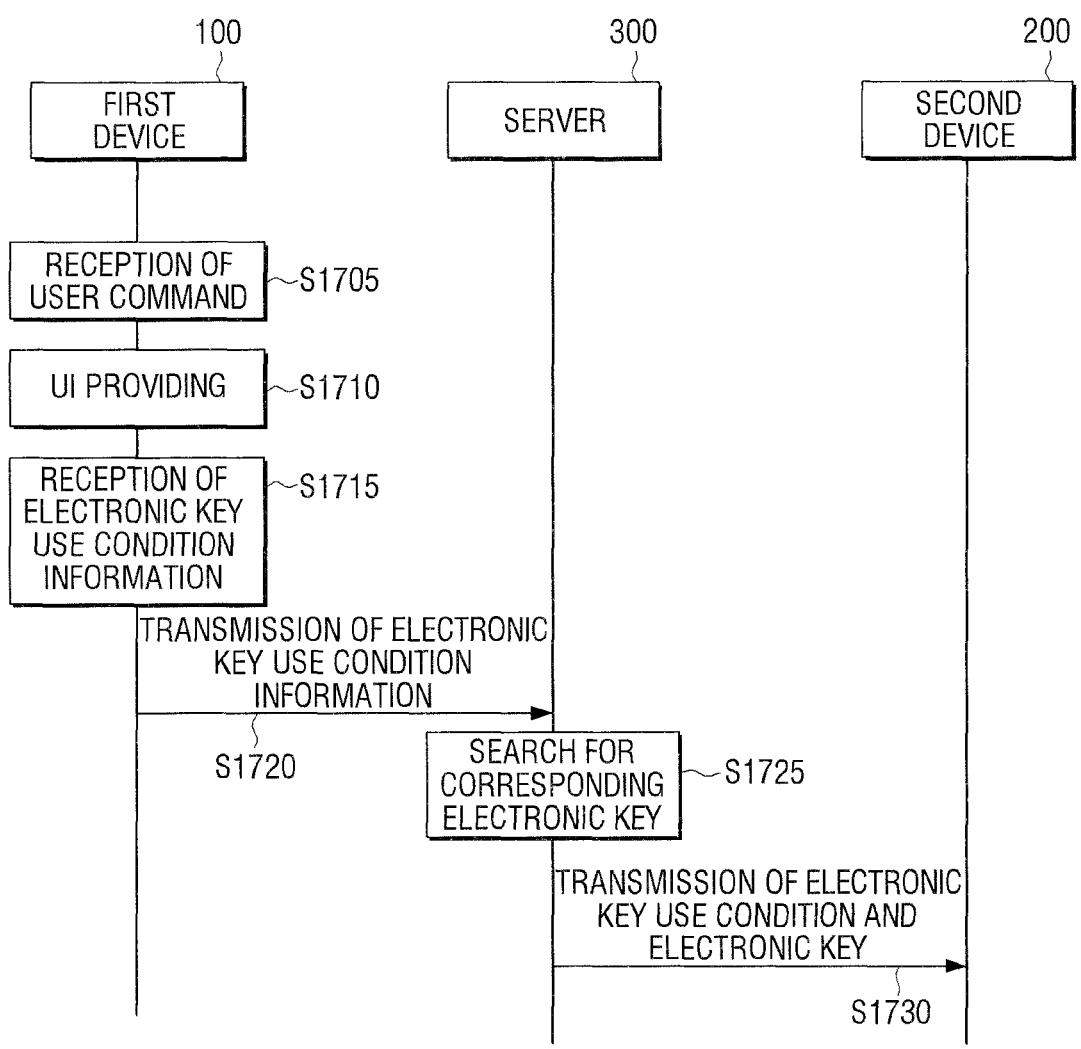
FIG. 17 is a flowchart illustrating operations between a device and a server according to an embodiment of the present disclosure.

FIG. 17 is a flowchart sequentially illustrating operations between a device and a server according to an embodiment of the present disclosure.

Referring to FIG. 17, the method is described under the assumption that a server 300 stores an electronic key.

When a first device 100 receives a user command for transmitting an electronic key to a second device 200 at operation S1705, a UI for setting an electronic key use condition may be displayed at operation S1710. A detailed form of the displayed UI has been described above.

When electronic key use condition information is input by use of a plurality of input items included in the displayed UI at operation S1715, the first device 100 may transmit the received electronic key use condition information to the server 300 at operation S1720. In this case, the first device 100 may transmit identification information related to the electronic key, as well as the electronic key use condition, to the server 300.

The server 300 may search for an electronic key corresponding to the electronic key identification information requested by the first device 100 at operation S1725. For example, the server 300 may store and manage electronic key information for each account corresponding to a plurality of users or a plurality of devices. The first device 100 may log in to the server 300 to request for transmission of an electronic key stored in an account of the first device 100, and the server 300 may search for the electronic key corresponding to the account.

The server 300 may transmit the electronic key use condition setting information received from the first device 100 and the searched electronic key to the second device 200 at operation S1730. The server 300 may receive identification information related to the second device 200 upon receiving the electronic key identification information from the first device 100, thereby transmitting the electronic key use condition setting information and the electronic key to the second device 200 based on the corresponding identification information.

In this embodiment, the first device 100 may provide not only a UI for setting the electronic key use condition but also a UI for selecting the electronic key stored in the server 300 and a UI for selecting the second device 200.

Figure 18:
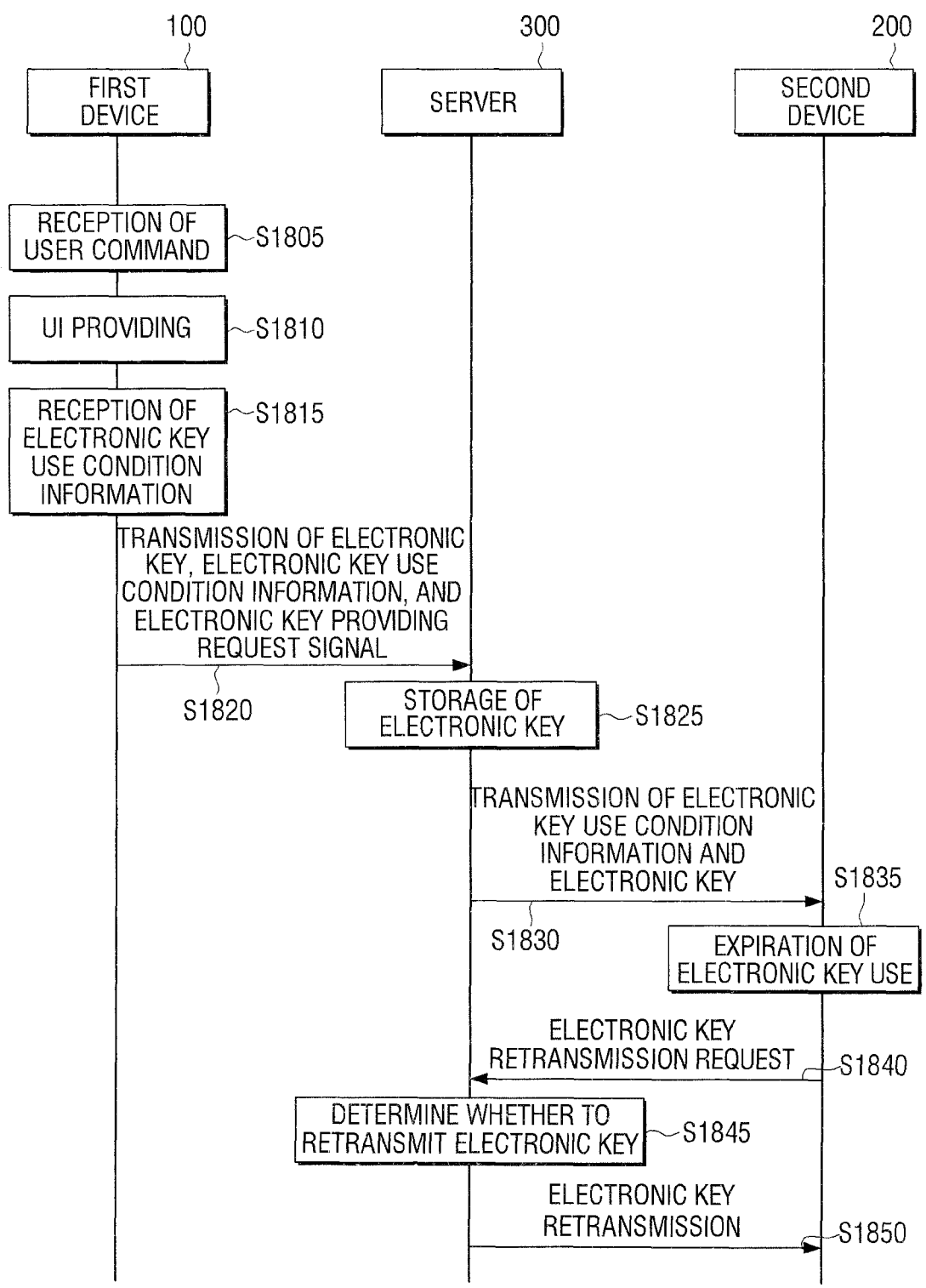
FIG. 18 is a flowchart illustrating operations between a device and a server according to an embodiment of the present disclosure.

FIG. 18 is a flowchart sequentially illustrating operations between a device and a server according to an embodiment of the present disclosure.

Referring to FIG. 18, the method is described under the assumption that a first device 100 stores an electronic key.

When the first device 100 receives a user command for transmitting an electronic key to a second device 200 at operation S1805, a UI for setting an electronic key use condition may be displayed at operation S1810. A detailed form of the displayed UI has been described above.

When electronic key use condition information is input through a plurality of input items included in the displayed UI at operation S1815, the first device 100 may transmit the received electronic key use condition information and the electronic key to the server 300 at operation S1820.

In this case, the server 300 may store the electronic key and the electronic key use condition information, which has been received from the first device 100 at operation S1825, and provide the electronic key and the electronic key use condition information to the second device 200 at operation S1830. Accordingly, the second device 200 may use the received electronic key according to the use condition information.

When the use of the received electronic key has expired at operation S1835, the second device 200 may request for an electronic key retransmission from the server 300 at operation S1840.

The server 300 may determine whether to retransmit the electronic key at operation S1845, and retransmit the electronic key to the second device 200 according to the determination result at operation S1850. The server 300 may determine whether or not to retransmit the electronic key based on information related to whether to retransmit the electronic key, which is included in the electronic key use condition information received from the first device 100, or determine whether to retransmit the electronic key by inquiring of the first device 100 whether to retransmit the electronic key.

The server 300 may also reset the electronic key use condition based on whether to reset the electronic key use condition included in the electronic key use condition information, or transmit the existent electronic key use condition information to the second device 200. For example, when the electronic key use condition information received from the first device 100 includes setting information indicating that the electronic key use condition has to be reset upon the retransmission of the electronic key, the server 300 may request the first device 100 to reset the use condition of the electronic key to be retransmitted to the second device 200. The server 300 may then receive the reset electronic key use condition information from the first device 100, and transmit the received reset electronic key use condition information to the second device 200.

Figure 19:
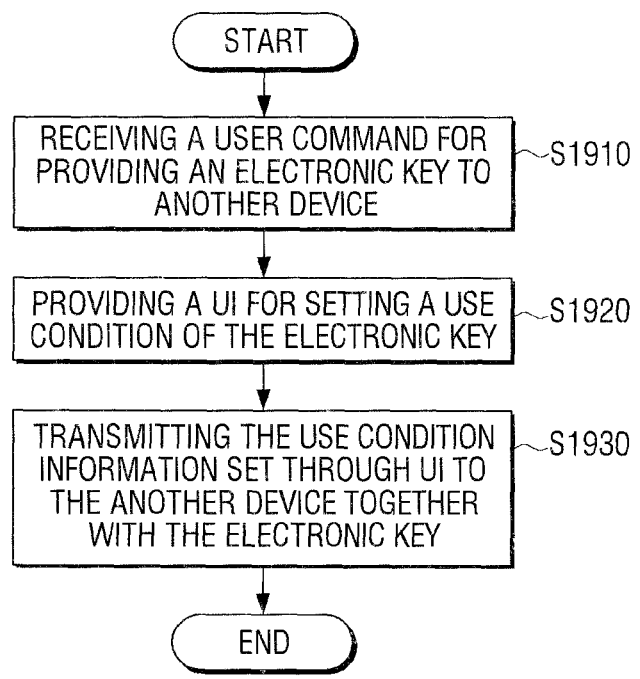
FIG. 19 is a flowchart illustrating a method for transmitting an electronic key of a device according to an embodiment of the present disclosure.

FIG. 19 is a flowchart illustrating a method for transmitting an electronic key of a device according to an embodiment of the present disclosure.

Referring to FIG. 19, when a user command for providing an electronic key to another device is received at operation S1910, a UI for setting a use condition of the electronic key may be provided at operation S1920.

The use condition information set through the UI may be transmitted to the another device together with the electronic key at operation S1930. The electronic key may be one stored in the device or one stored in a server.

In the operation S1920 of providing the UI, a plurality of input items for setting the use condition of the electronic key may be differentially activated and displayed according to a preset criterion. The plurality of input items may include at least one of a use count, a use time, a use period, and a copy-limit with respect to an electronic key.

The preset criterion may be a preset priority for each of the plurality of input items. In the operation S1920 of providing the UI, the plurality of input items may be gradually activated and displayed, starting from an input item with a high priority, based on the priorities preset to the plurality of input items, respectively.

The preset criterion may also be a lapsed time after the plurality of input items are displayed. In the operation S1920 of providing the UI, the plurality of input items may be gradually activated and displayed, based on the lapsed time after the plurality of input items are displayed.

The preset criterion may also be a user gesture input into the device. In the operation S1920 of providing the UI, the plurality of input items may be gradually activated and displayed, based on intensity that the device is shaken when the user gesture is a shaking motion that the device is shaken.

The order of differentially activating the plurality of input items may be preset priorities for the plurality of input items.

Also, in the operation S1920 of providing the UI, the gradually activated input items may be displayed with sizes relatively reduced.

In the operation S1930 of transmitting the electronic key, when the electronic key transmission is completed, an electronic key transfer for deleting the electronic key stored in the device may be executed or an electronic key copy for maintaining the stored state of the electronic key may be executed.

In the operation S1930 of transmitting the electronic key, the electronic key and use condition information related to the electronic key may be transmitted to an NFC reader installed in another device through NFC tagging.

The control method in accordance with the aforementioned embodiments may be provided to a user terminal device by being implemented into forms of programs.

For example, a device in accordance with one embodiment may be provided with a non-transitory computer readable medium, which stores a program for executing receiving a user command for providing an electronic key to another device, providing a UI for setting a use condition of the electronic key when the user command is received, and transmitting use condition information set through the UI and the electronic key to the another device.

The non-transitory computer readable medium is a medium, which stores data semi-permanently and is readable by a device, not a medium storing data for brief moment such as a register, cache, or a memory etc. Specifically, various applications and programs described above may be provided by being stored in the non-transitory computer readable medium such as a CD, a DVD, a hard disk, a Blu-ray disk, an USB, a memory card, a ROM, etc.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting an electronic key of a device, the method comprising:
   receiving a user command for providing the electronic key to an external device;
   providing a user interface (UI) for setting a use condition information of the electronic key;
   in response to the receiving of a user command for setting the use condition information of the electronic key, setting the use condition information of the electronic key;
   performing authentication for transmission of the set use condition information of the electronic key and the electronic key to the external device; and
   transmitting, through a server, the electronic key and the use condition information set to the electronic key to the external device through the server based on a result of the authentication,
   wherein the providing the UI comprises:
      arranging a plurality of input items based on a security level corresponding to each of the plurality of input items for setting the use condition of the electronic key, providing the UI including the arranged plurality of input items of an inactive state, and differentially activating the plurality of input items for setting the use condition based on a preset criterion and a preset priority, wherein the preset criterion is a lapsed time between each subsequent input item that is sequentially activated, and wherein the preset priority is based on the arranging of the plurality of input items and each corresponding security level.

2. The method of claim 1, further comprising:

transmitting the use condition information to the server, wherein, based on the authentication being completed, the server is configured to:

determine the electronic key corresponding to the device among a plurality of electronic keys stored in the server based on authentication information, and transmit, to the external device, the determined electronic key and the use condition information received from the device.

3. The method of claim 2, wherein the plurality of electronic keys correspond to a plurality of accounts, and wherein the server is further configured to determine the electronic key corresponding to an account related to the authentication information.

4. The method of claim 1, wherein, based on the authentication being completed, the server is configured to:

determine the electronic key and the use condition information corresponding to the device among a plurality of electronic keys and a plurality of use condition information stored in the server based on authentication information, and transmit, to the external device, the determined electronic key and the determined use condition information.

5. The method of claim 4, wherein the plurality of electronic keys and the use condition information correspond a plurality of accounts, and wherein the server is further configured to determine the electronic key and the use condition information corresponding to an account related to the authentication information.

6. The method of claim 1, wherein, based on the authentication being completed, the server is configured to:

store complete information for which the authentication for the transmission of the electronic key is completed, and in response to receiving a request for transmission of the electronic key from the external device, transmit, to the external device, the electronic key and the use condition information according to approval of a user of the device within a predetermined time based on the complete information.

7. The method of claim 1, wherein the use condition information comprises at least one of a use count, a use time, a use period, or a copy-limit of the electronic key.

8. A device for transmitting an electronic key, the device comprising:

a display configured to display a screen;

a transceiver configured to communicate with a server or an external device; and a processor configured to:

receive a user command for transmitting the electronic key to the external device, provide a user interface (UI) for setting a use condition information of the electronic key, in response to the receiving of the user command for setting the use condition information of the electronic key on the UI, set the use condition information of the electronic key, perform authentication for transmission of the set use condition information of the electronic key and the electronic key to the external device, and transmit the electronic key and the use condition information set to the electronic key to the external device through the server based on a result of the authentication, wherein the processor is further configured to:

arrange a plurality of input items based on a security level corresponding to each of the plurality of input items for setting the use condition of the electronic key, provide the UI including the arranged plurality of input items of an inactive state, and differentially activate the plurality of input items for setting the use condition based on a preset criterion and a preset priority, wherein the preset criterion is a lapsed time between each subsequent input item that is sequentially activated, and wherein the preset priority is based on the arranging of the plurality of input items and each corresponding security level.

9. The device of claim 8, wherein the processor is further configured to transmit the use condition information to the server, and wherein, based on the authentication being completed, the server is configured to:

determine the electronic key corresponding to the device among a plurality of electronic keys stored in the server based on authentication information, and transmit, to the external device, the determined electronic key and the use condition information received from the device.

10. The device of claim 9, wherein the plurality of electronic keys correspond to a plurality of accounts, and wherein the server is further configured to determine the electronic key corresponding to an account related to the authentication information.

11. The device of claim 8, wherein, based on the authentication being completed, the server is configured to:

determine the electronic key and the use condition information corresponding to the device among a plurality of electronic keys and a plurality of use condition information stored in the server based on authentication information, and transmit, to the external device, the determined electronic key and the determined use condition information.

12. The device of claim 11, wherein the plurality of electronic keys and the use condition information correspond a plurality of accounts, and wherein the server is further configured to determine the electronic key and the use condition information corresponding to an account related to the authentication information.

13. The device of claim 8, wherein, based on the authentication being completed, the server is configured to:

store complete information for which the authentication for the transmission of the electronic key is completed, and in response to receiving a request for transmission of the electronic key from the external device, transmit, to the external device, the electronic key and the use condition information according to approval of a user of the device within a predetermined time based on the complete information.

14. The device of claim 8, wherein the use condition information comprises at least one of a use count, a use time, a use period, or a copy-limit of the electronic key.

* * * * *